(12) United States Patent
Briee et al.

(10) Patent No.: US 7,430,077 B2
(45) Date of Patent: Sep. 30, 2008

(54) SOLAR TRACKING REFLECTOR SYSTEM FOR STRUCTURE LIGHTING

(75) Inventors: Steven Briee, Park City, UT (US); Artner B. Chace, Jr., Garland, TX (US); Eugene J. Daunis, McKinney, TX (US); Raynor A. Mallory, Denton, TX (US)

(73) Assignee: Ciralight, Inc., Park City, UT (US)

( * ) Notice: Subject to any disclaimer, the term of this patent is extended or adjusted under 35 U.S.C. 154(b) by 0 days.

(21) Appl. No.: 11/754,156

(22) Filed: May 25, 2007

(65) Prior Publication Data

US 2007/0297058 A1 Dec. 27, 2007

Related U.S. Application Data

(60) Provisional application No. 60/803,362, filed on May 27, 2006.

(51) Int. Cl.
*G02B 17/00* (2006.01)

(52) U.S. Cl. ........................... 359/591; 359/597

(58) Field of Classification Search ................ 359/591, 359/592, 596, 597; 126/574–575; 353/3
See application file for complete search history.

(56) References Cited

U.S. PATENT DOCUMENTS

| | | | |
|---|---|---|---|
| 4,340,812 A * | 7/1982 | Mori ........................ 250/203.1 |
| 4,368,962 A | 1/1983 | Hultberg | |
| 4,429,178 A | 1/1984 | Prideaux et al. | |
| 4,440,150 A | 4/1984 | Kachler | |
| 4,586,488 A * | 5/1986 | Noto ........................... 126/578 |
| 4,625,709 A | 12/1986 | Brandstätter | |
| 4,628,142 A | 12/1986 | Hashizume | |
| 4,720,170 A * | 1/1988 | Learn, Jr. .................... 359/597 |
| 4,742,813 A | 5/1988 | Richl et al. | |
| 4,794,909 A | 1/1989 | Eiden | |
| 4,883,340 A | 11/1989 | Dominguez | |
| 5,493,824 A * | 2/1996 | Webster et al. ................ 52/200 |
| 5,517,358 A | 5/1996 | Dominguez | |
| 5,729,387 A | 3/1998 | Takahashi et al. | |
| 5,999,323 A | 12/1999 | Wood | |
| 6,433,932 B1 | 8/2002 | Aoki et al. | |
| 6,465,725 B1 * | 10/2002 | Shibata et al. .............. 136/246 |
| 6,493,145 B1 | 12/2002 | Aoki et al. | |
| 6,801,361 B2 | 10/2004 | Aoki et al. | |
| 6,827,445 B2 | 12/2004 | Abe et al. | |

\* cited by examiner

*Primary Examiner*—Christopher Mahoney
(74) *Attorney, Agent, or Firm*—Jerry Turner Sewell

(57) ABSTRACT

A solar tracking device is mounted above a skylight of a building. An array of mirrors is rotated at a rate of one revolution per day to reflect sunlight through the skylight. A control circuit intermittently adjusts the angular position of the tracking device so that the mirrors face the sun. A solar array charges an internal energy storage system so that no external power source is needed. The control circuit within the tracking device reduces the power requirements at night and when not moving the tracking device during the daytime to conserve electrical energy.

16 Claims, 24 Drawing Sheets

US 7,430,077 B2

SOLAR TRACKING REFLECTOR SYSTEM FOR STRUCTURE LIGHTING

RELATED APPLICATIONS

The present application claims the benefit of priority under 35 USC § 119(e) to U.S. Provisional Application No. 60/803,362, filed on May 27, 2006.

BACKGROUND OF THE INVENTION

1. Field of the Invention

The present invention is in the field of building interior illumination using reflected sunlight through an opening in the roof (e.g., a skylight).

2. Description of the Related Art

Skylights provide natural sunlight to interior locations of a building that receive little or no light via windows. Although passive skylights are adequate in some situations, generally such skylights only provide sufficient lighting when the sun is at or near its zenith. During the winter months, the sun is so low in the southern sky (assuming the building is in the northern hemisphere) that the lighting provided by a skylight is not sufficient even when the sun is at its zenith.

Many mechanisms have been developed in response to the foregoing problem. For example, U.S. Pat. Nos. 5,999,323 (Wood), 6,433,932 (Aoki et al.), 6,493,145 (Aoki et al.), and 6,801,361 (Aoki et al.) illustrate a number of mechanisms for reflecting sunlight through a skylight to illuminate the interior of a building. The mechanisms include one or more mirrors positioned at an angle with respect to vertical so that when the sun is positioned low in the sky, the sunlight is reflected downward into the building. The mechanisms are motorized so that each mirror faces the sun and tracks the apparent movement of the sun across the sky. Thus, the light from the sun is reflected during the morning and the afternoon as well as during midday.

Although the known mechanisms provide advantages over passive skylights, the mechanisms include complicated structures and control mechanisms and thus tend to be unreliable and expensive to purchase, install and maintain. A need continues to exist for a room-mounted solar tracking device that is reliable and inexpensive and that is simple to install, and that requires little or no maintenance.

SUMMARY OF THE INVENTION

A solar tracking device for mounting above a skylight of a building includes a vertical support structure that receives the shaft of a motorized control head. The control head encloses control circuitry and a motor. A shaft extending from the control head is held in a fixed position by the vertical support structure so that when the motor operates, the frame of the motor rotates about the shaft along with the control box. The rotation of the control box is controlled so that the control box generally follows the apparent motion of the sun during daylight hours.

A mirror support structure supports a plurality of mirrors that are positioned at an angle to reflect sunlight through the skylight. The mirror support structure is mechanically coupled to the control box and rotates with the control box.

A solar array is also mechanically coupled to the control box and is positioned to face the sun when the mirrors are positioned to face the sun. The solar array produces electrical power from solar energy. The electrical power is communicated to a storage system within the control box. The storage system provides electrical power to the control circuitry and thus to the motor. No external electrical power is provided to the solar tracking device. The storage system stores a sufficient amount of energy to maintain the operation of the solar tracking device even if the sun is occluded for a number of successive days. The storage system is replenished rapidly when the solar array is exposed to the sun.

In accordance with a first preferred embodiment, a solar tracking system mountable above a skylight of a building includes a control box. An electrical motor within the control box drives the control box about a shaft that extends below the control box. A vertical support structure is positionable above a central portion of the skylight. The vertical support structure has an upper portion that receives the shaft extending from the control box. A motion control circuit within the control box controls the motor to cause the control box to rotate about the extended shaft. A voltage supply circuit within the control box provides electrical energy to the motion control circuit and the motor. A solar array mechanically and electrically coupled to the control box produces electrical energy in response to sunlight and provides the electrical energy to the voltage supply circuit within the control box sufficient to operate the control box without any other source of electrical energy. Mirrors are coupled to the control box to rotate with the control box. The mirrors are positioned at respective angles to reflect sunlight through the skylight into the building. In the illustrated embodiment of the solar tracking system, the motion control circuit intermittently rotates the control box during daytime hours to position the mirrors towards calculated positions of the sun. The motion control circuit rotates the control box at the end of a day to a calculated position of the sun at sunrise on the next following day. The motion control circuit calculates the position of the azimuthal position of the sun based on the date and time of day and based on at least the latitude and longitude position of the solar tracking system. In certain embodiments, the latitude and longitude position are permanently stored in a non-volatile memory within the motion control circuitry. In other embodiments, the latitude and longitude position and the date and time of day are obtained by accessing a global positioning receiver incorporated into the motion control circuitry.

In a particularly preferred embodiment, the voltage supply circuit comprises first, second, third and fourth voltage generating circuits. The first voltage generating circuit comprises passive components coupled to the electrical output of the solar array to charge at least a first storage capacitor to a variable voltage. The variable voltage across the storage capacitor is limited to a maximum value by a first voltage limiting device. The second voltage generating circuit also comprises passive components coupled to the electrical output of the solar array. The second voltage generating circuit comprises a second voltage limiting device to provide a limited output voltage. The limited output voltage is provided to a common voltage node, which is coupled to the power input terminals of digital devices in the motion control circuit. The third voltage generating circuit comprises a buck power supply coupled to receive the variable voltage from the first voltage circuit. The buck power supply produces a first constant voltage when enabled by the motion control circuit. The first constant voltage is provided as a power source for the electrical motor. The fourth voltage generating circuit comprises a boost power supply coupled to receive the first constant voltage. The boost power supply produces a second constant voltage when enabled by the motion control unit. The second constant voltage is provided to the common voltage node such the voltage at the common voltage node is the higher of the limited output voltage from the second voltage generating circuit or the second constant voltage. A second storage capacitor is coupled to the common voltage node to be charged by the higher of the limited output voltage from the second voltage generating circuit or the second constant voltage from the fourth voltage generating circuit. The second storage capacitor supplies electrical energy to the common voltage node when the limited output voltage and the second constant voltage are both less than the voltage across the second storage capacitor. Preferably, the buck power supply is selectively enabled by an enable signal from the motion control circuit. The enable signal is maintained in an inactive state until the motion control circuit receives a sufficient voltage from the first voltage generating circuit to be fully operational.

Preferably, the first storage capacitor is a super capacitor having a capacitance of at least 1 farad. Also preferably, the second storage capacitor is a super capacitor.

In a second embodiment, the control box for the solar tracking system has an outer wall that is penetrated by at least two openings. The two openings are positioned on the outer wall such that one of the openings faces the sun when the angular position of the solar array and the mirrors lags the apparent position of the sun by at least an angular amount. The other opening faces the sun when the angular position of the solar array and the mirrors leads the apparent position of the sun by at least approximately the same angular amount. At least one photodetector is located within the control box. The photodetector is positioned with respect to the two openings such that the photodetector is shaded by the outer wall when the solar array and the plurality of mirrors are facing the sun. When shaded from sunlight, the photodetector is inactive. The photodetector receives sunlight and produces an output signal when either of the two openings is facing the sun. If one of the openings is facing the sun, the angular position of the solar array and the mirrors is either leading or lagging the angular position of the sun. Accordingly, the solar array produces less energy and the mirrors are not reflecting a maximum quantity of sunlight. The control circuitry responds to the output signal produced by the photodetector and adjusts the rotation rate of the motor. The control circuitry temporarily adjusts the rotation rate to rotate the control box until the photodetector is no longer producing an output signal caused by light through the opening that was facing the sun. The control circuitry continues to rotate the control box for a sufficient angular distance to expose the photodetector to light through the other opening. If the photodetector does not produce a signal when the control box has rotated by the sufficient angular distance, then the other opening must be located in the opposite angular direction. If the light from the second opening is not detected by rotating in the original direction, the control circuitry reverses the direction of rotation. After rotating by the sufficient angular distance in the second direction, the photodetector again detects the light through the first opening. The control circuitry continues rotating in the reverse direction at the higher rotation rate until the photodetector detects the light through the second opening. When the photodetector detects the light through the second opening, the control system is able to determine whether the original rotation rate was too fast or two slow. In particular, if the light from the second opening is detected when rotating at the higher rotation rate in the original direction, the original rotation rate was too slow. Accordingly, the rotation rate needs to be increased. If the second opening is detected when rotating at the higher rotation rate in the second direction, the original rotation rate was too fast. Accordingly, the rotation rate needs to be decreased.

Before adjusting the rotation rate, the control circuitry in the second embodiment first returns the control box to a position where the photodetector is shaded from sunlight and where the solar array and the mirrors are facing the sun. The control circuitry is able to determine the direction and angular distance to rotate the control box because the previous operations have identified which opening is allowing light to impinge on the photodetector. The angular distance traveled between the angular positions where the photodetector is active is also known. Accordingly, the control circuitry moves the control box by an angular distance of approximately one-half the angular distance between the two active positions.

In preferred implementations of the second embodiment, the control circuitry increases or decreases the original rotation rate by a specific amount each time the control circuitry performs the foregoing operations. In preferred implementations, the control circuitry varies the magnitude of the change of the rotation rate in accordance with the time lapsed since the previous adjustment. Thus, the control system gradually adjusts the rotation rate to closely match the apparent rate of movement of the sun.

The control circuitry of the second embodiment, adapts to a new installation by rotating the control box at a higher rate when initially installed until the light through each opening is detected by the photodetector. The control circuitry determines from the times at which the photodetector produces the output signal whether the system is installed in the northern hemisphere or the southern hemisphere. The control circuit selects the normal direction of rotation in accordance with the location where the system is installed.

BRIEF DESCRIPTIONS OF THE DRAWINGS

Certain embodiments in accordance with the present invention are described below in connection with the accompanying drawing figures in which.

Figure 1:
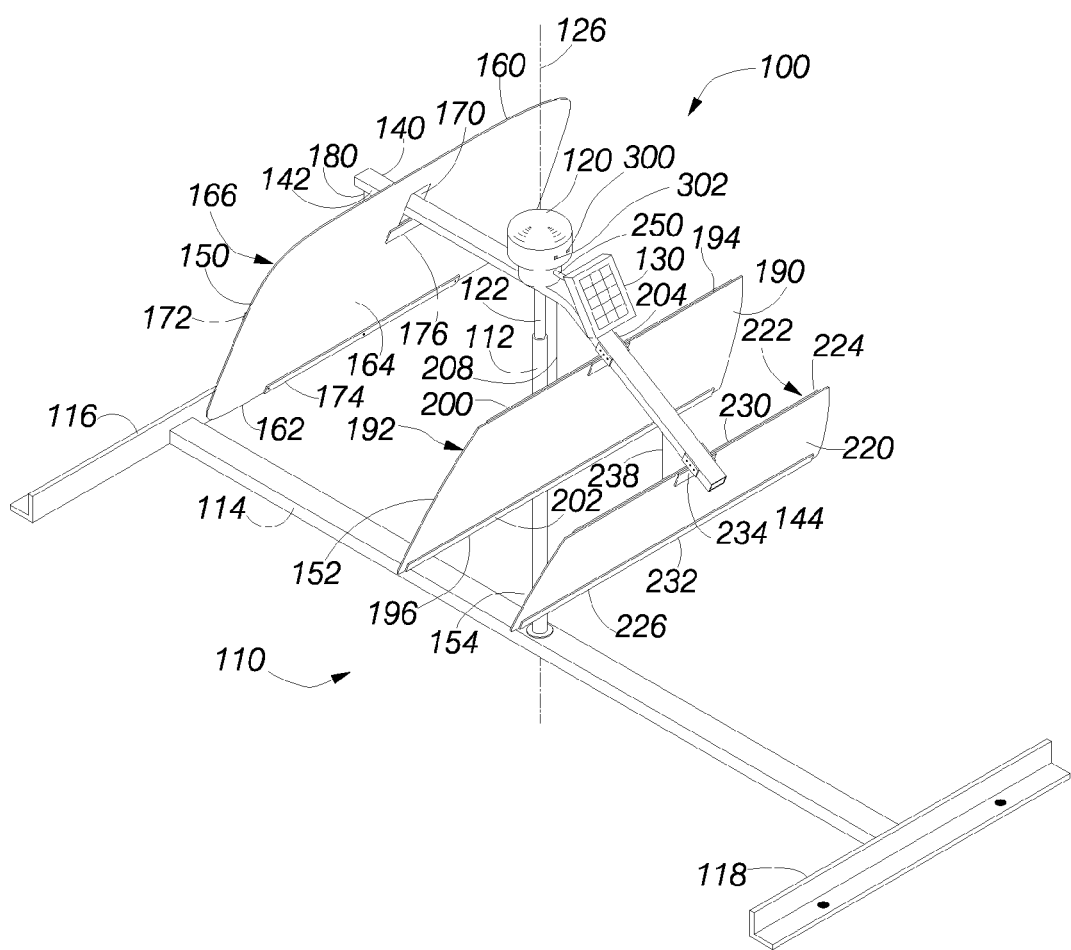
FIG. 1 illustrates one embodiment of a solar tracking system comprising a support structure, a rotating control box, a solar array that generates power, a mirror support beam, and a plurality of mirrors.
Figure 6:
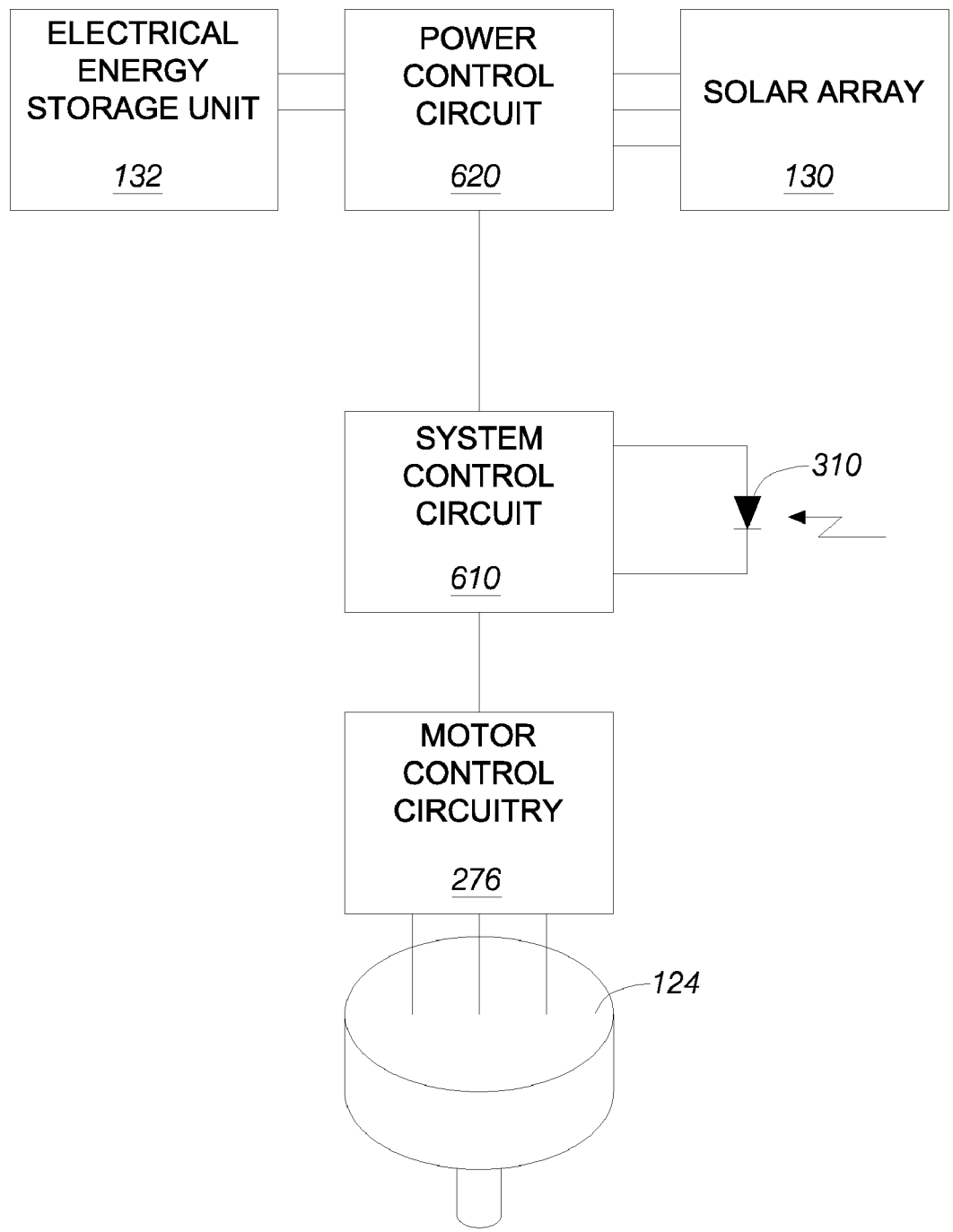
FIG. 6 illustrates a block diagram of the electrical circuitry of the control box of FIG. 1.
Figure 7A:
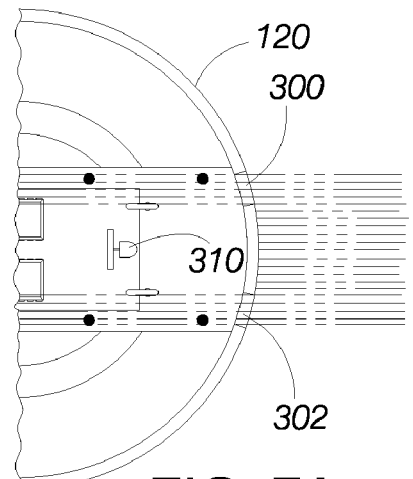
Figure 7B:
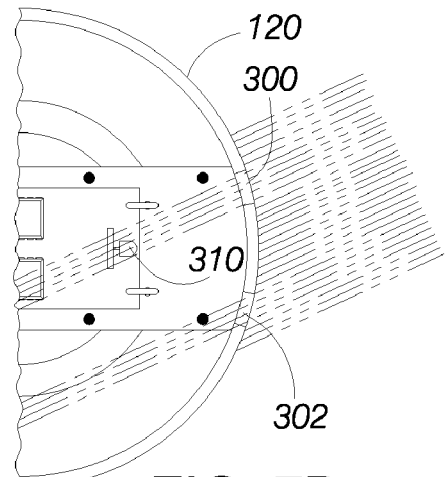
Figure 7C:
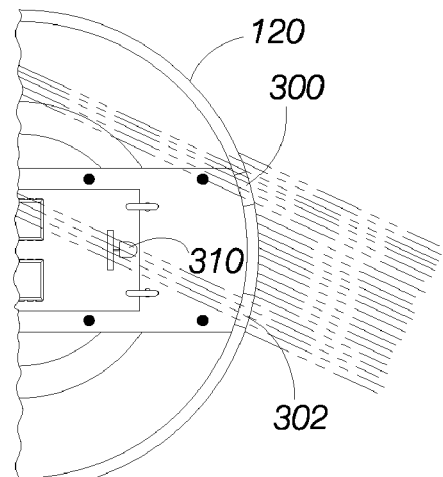
Figure 8:
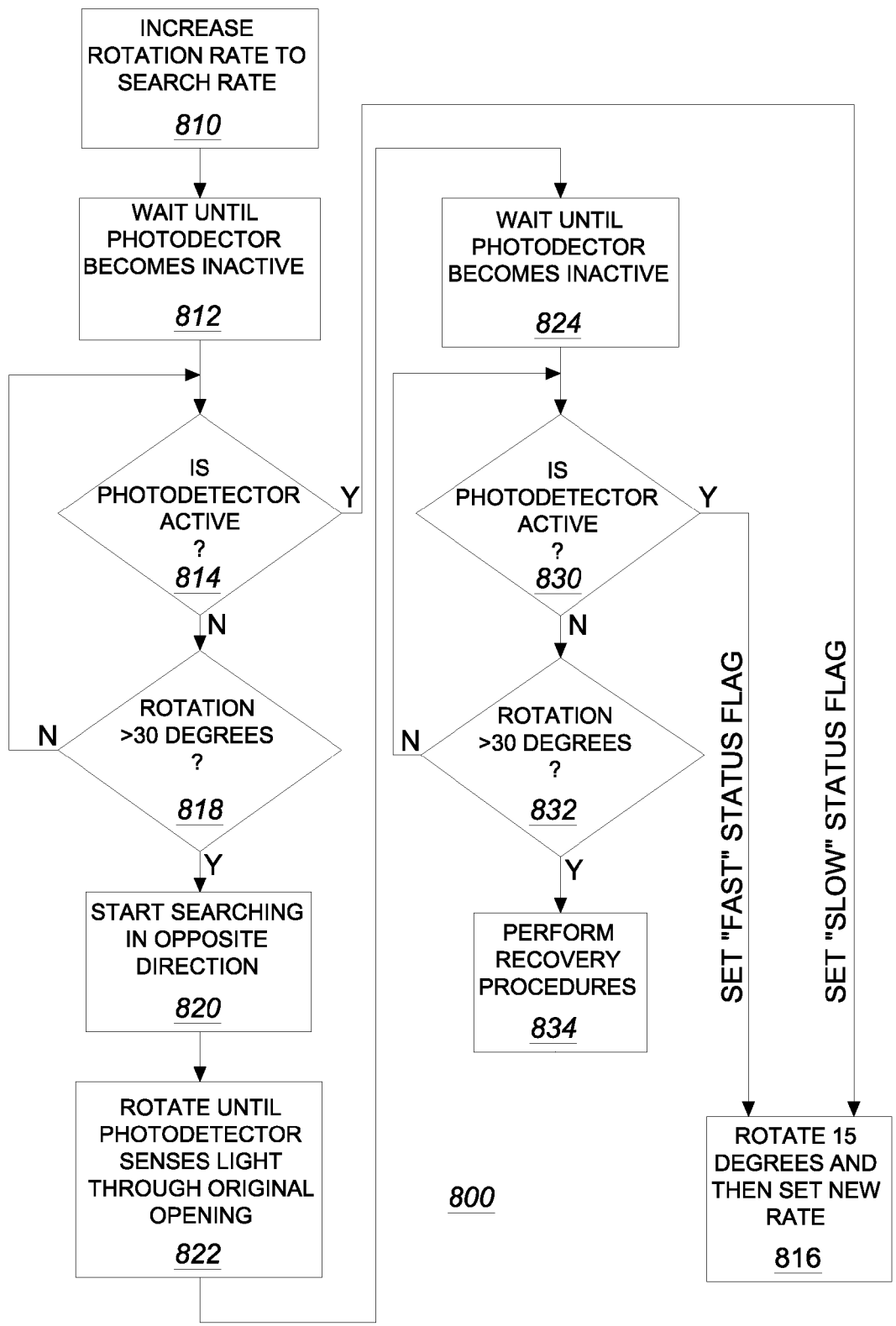
Figure 9:
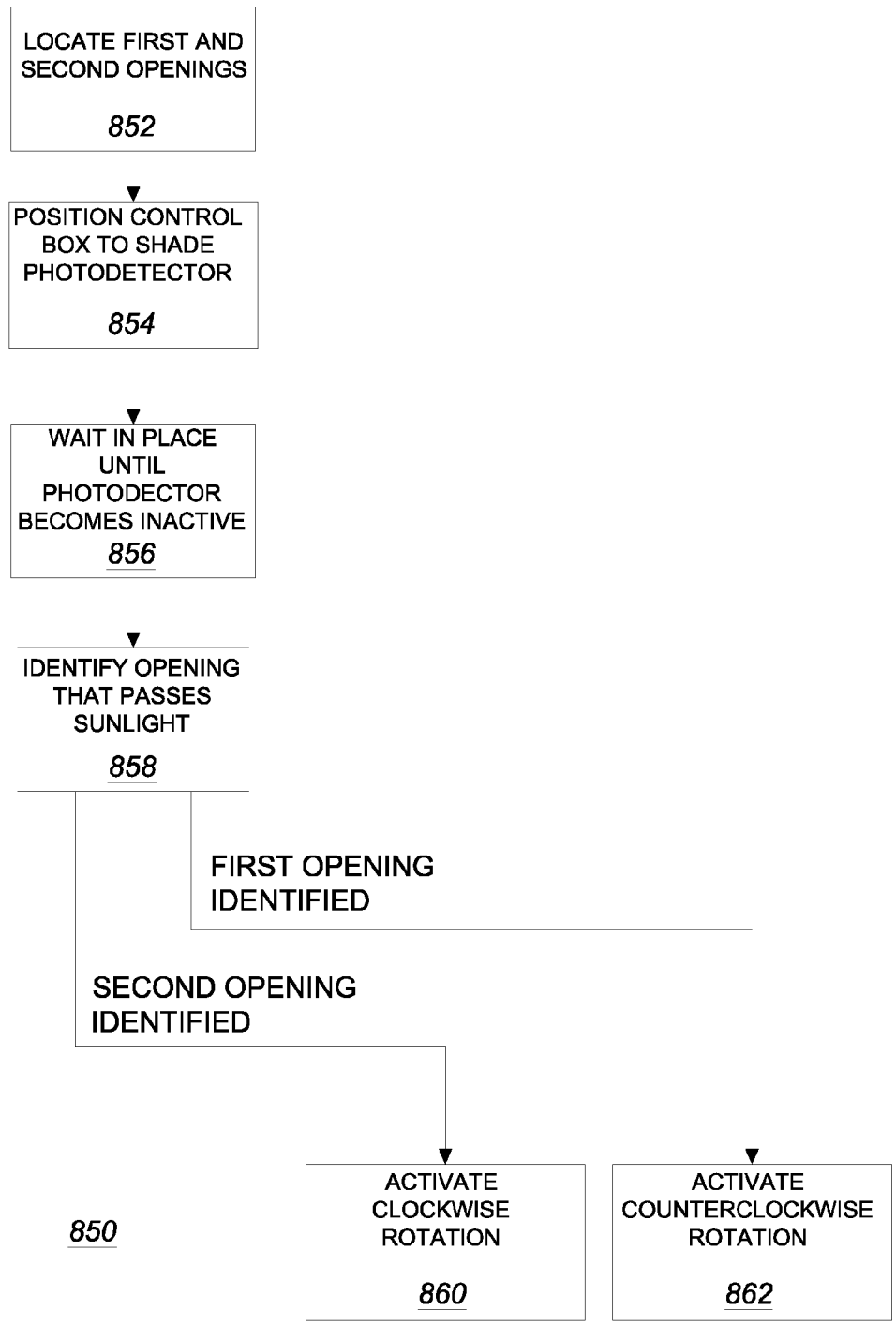
Figure 10:
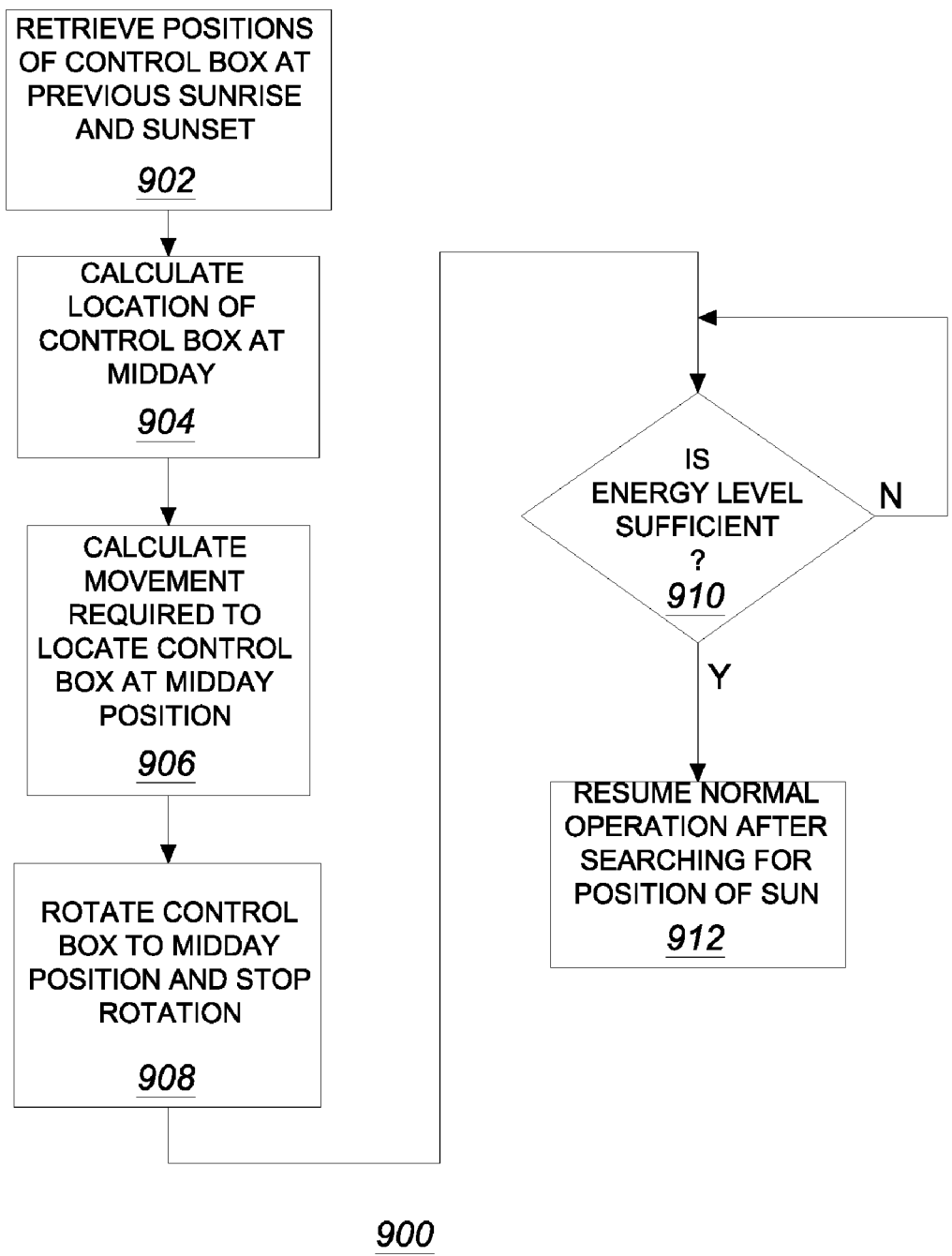
Figure 11:
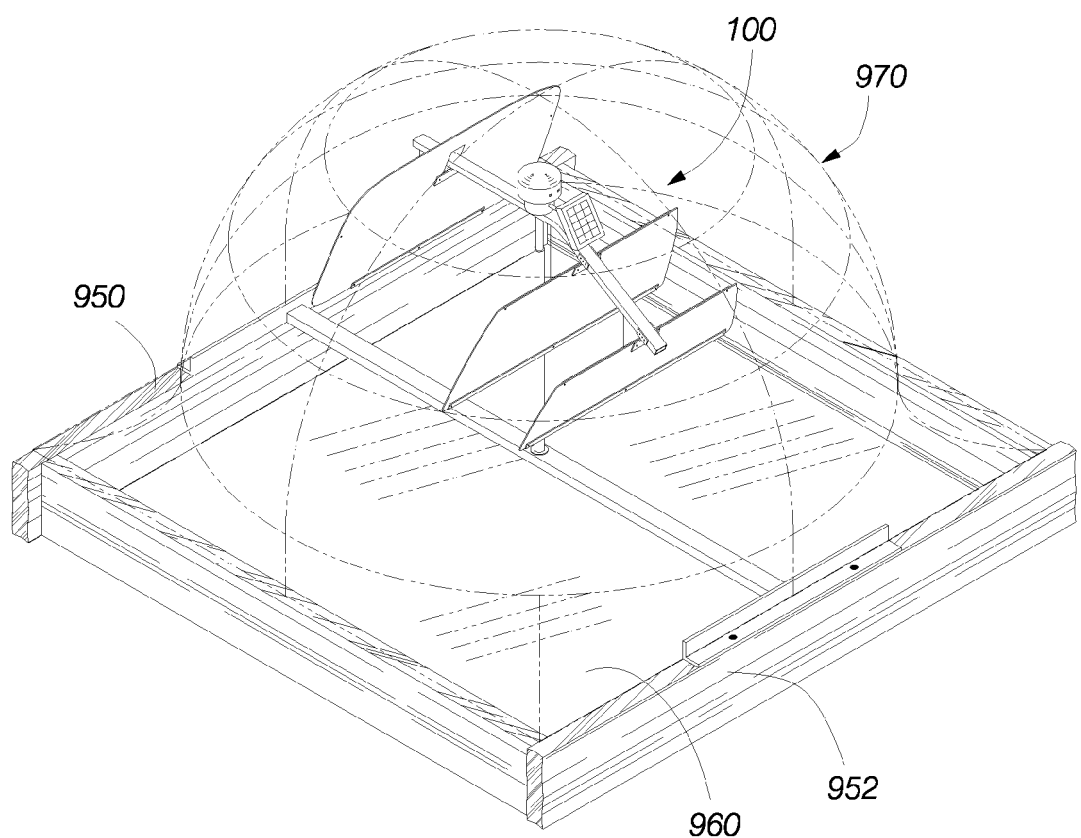
Figure 12:
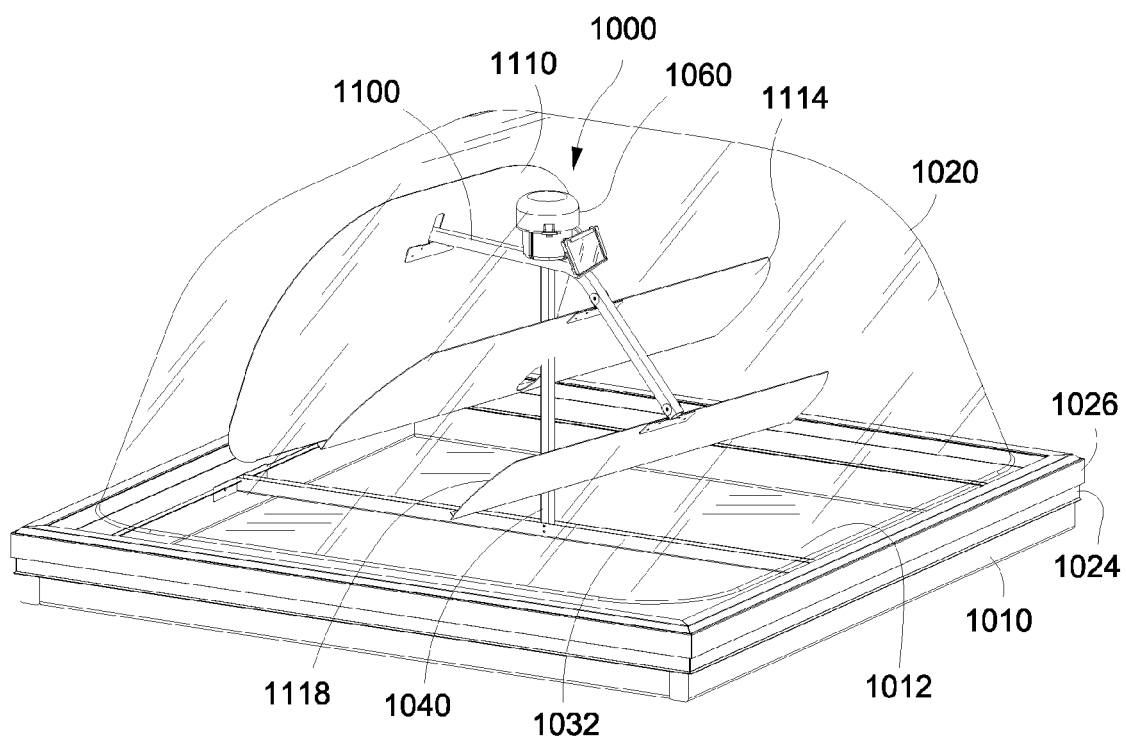
Figure 13:
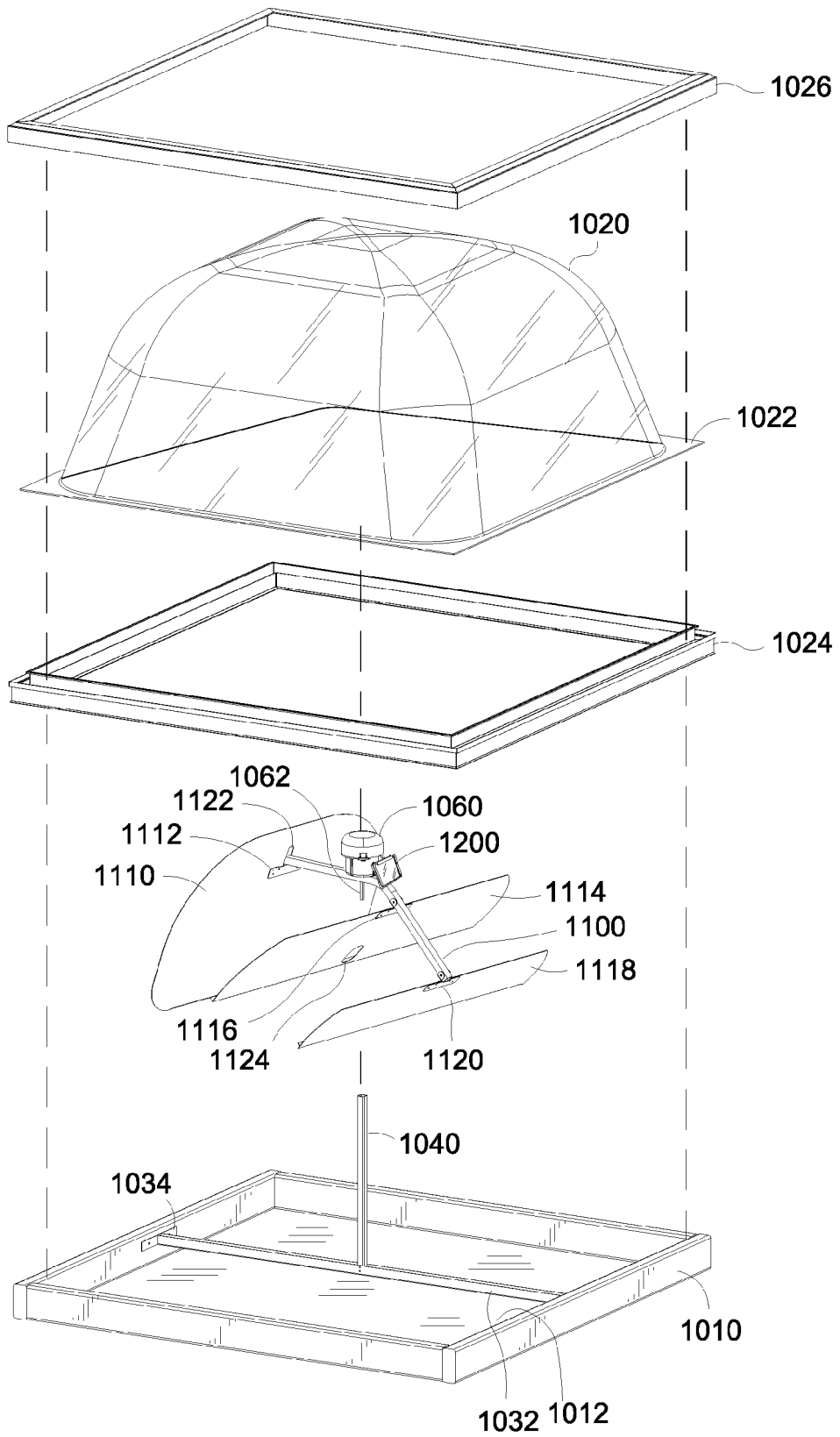
Figure 14:
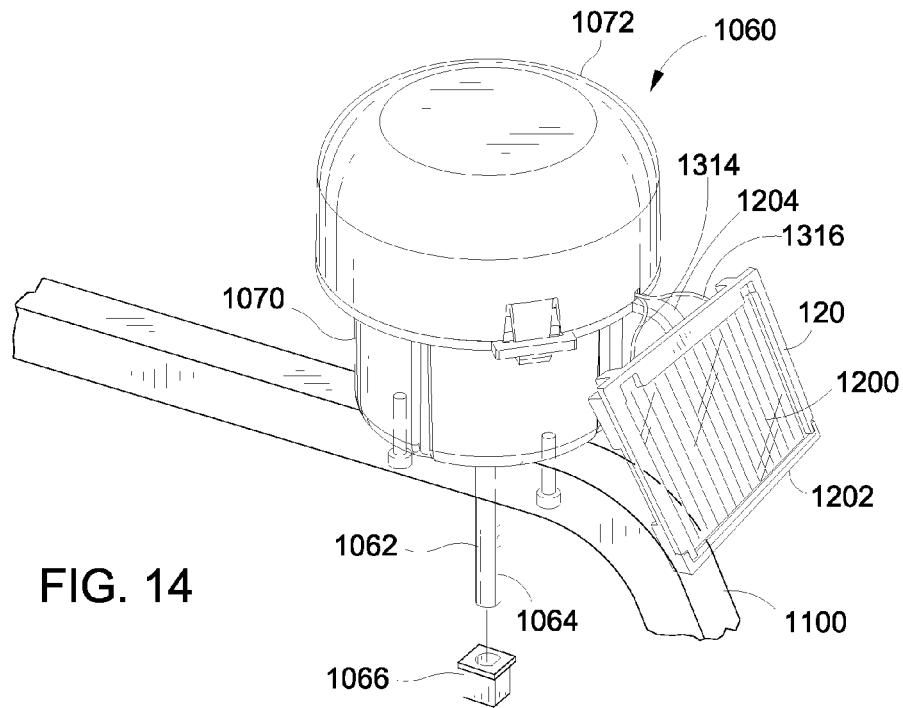
Figure 15:
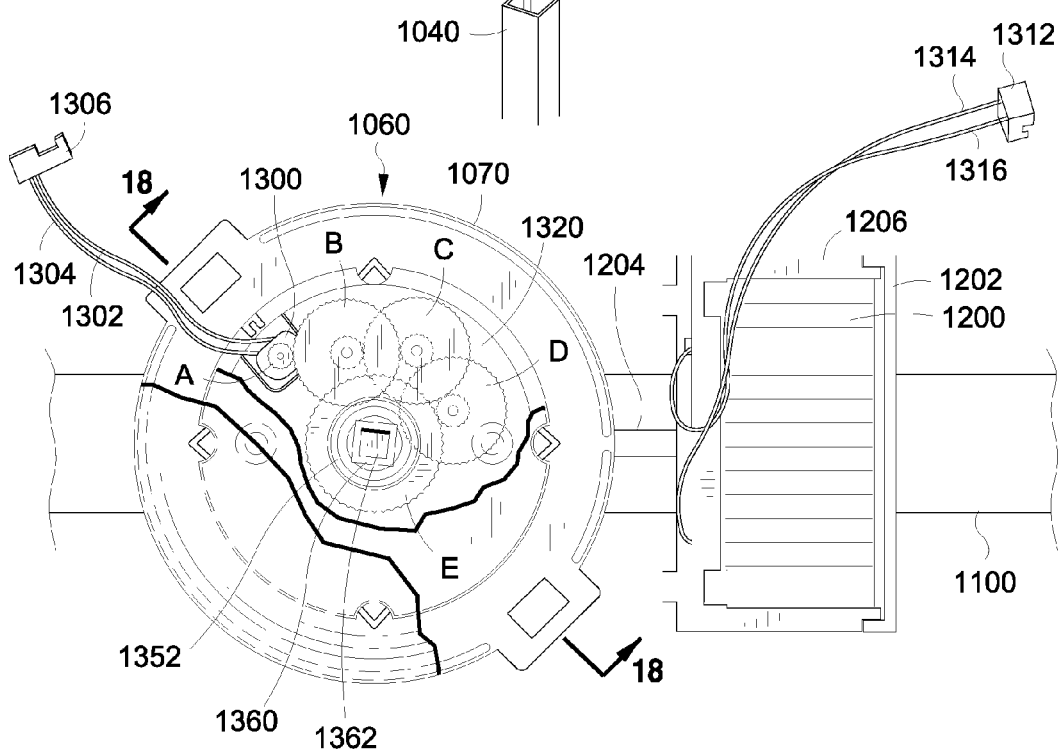
Figure 17:
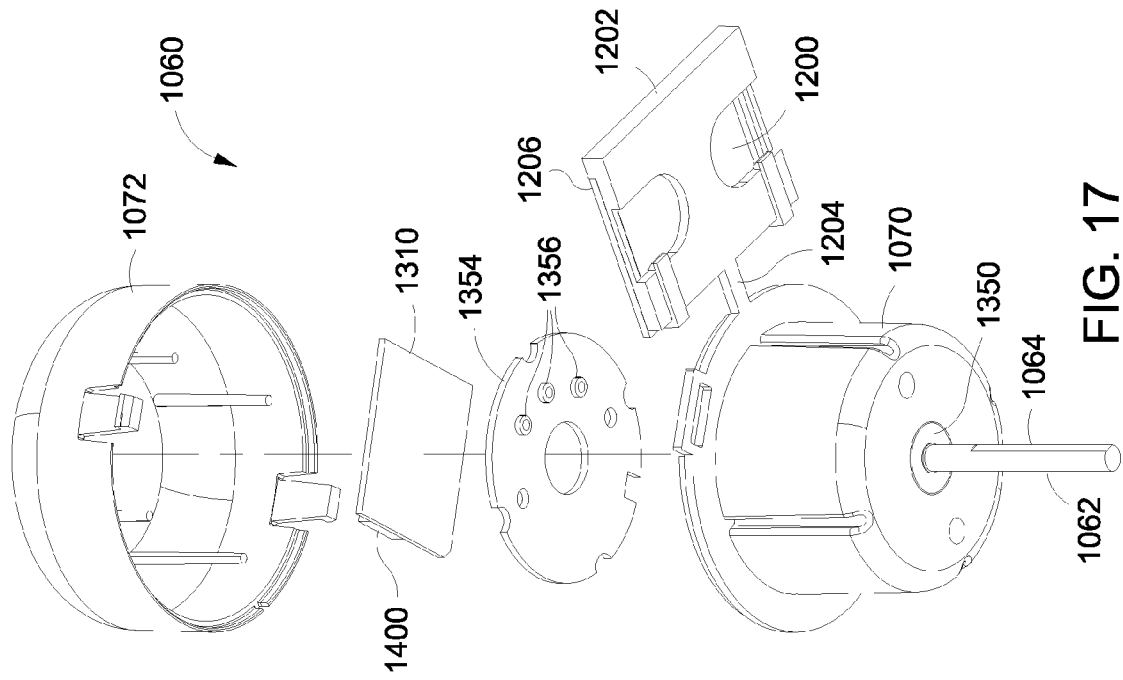
Figure 16:
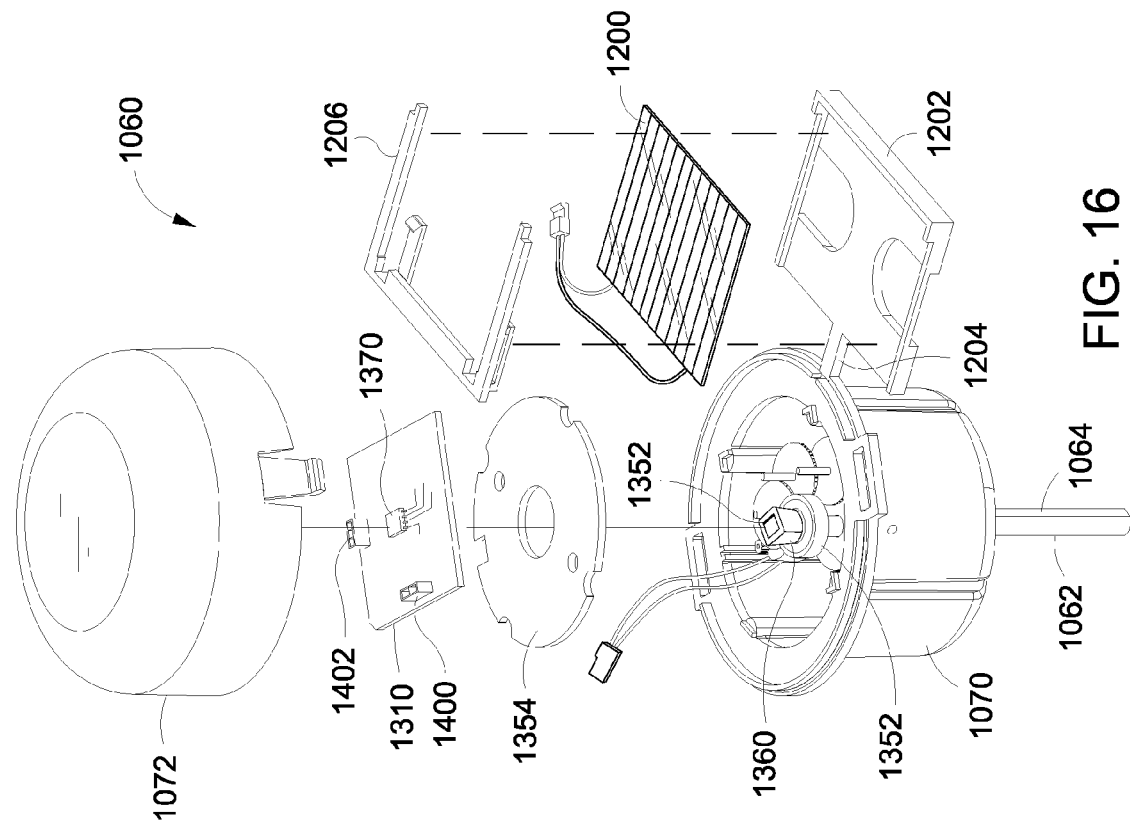
Figure 18:
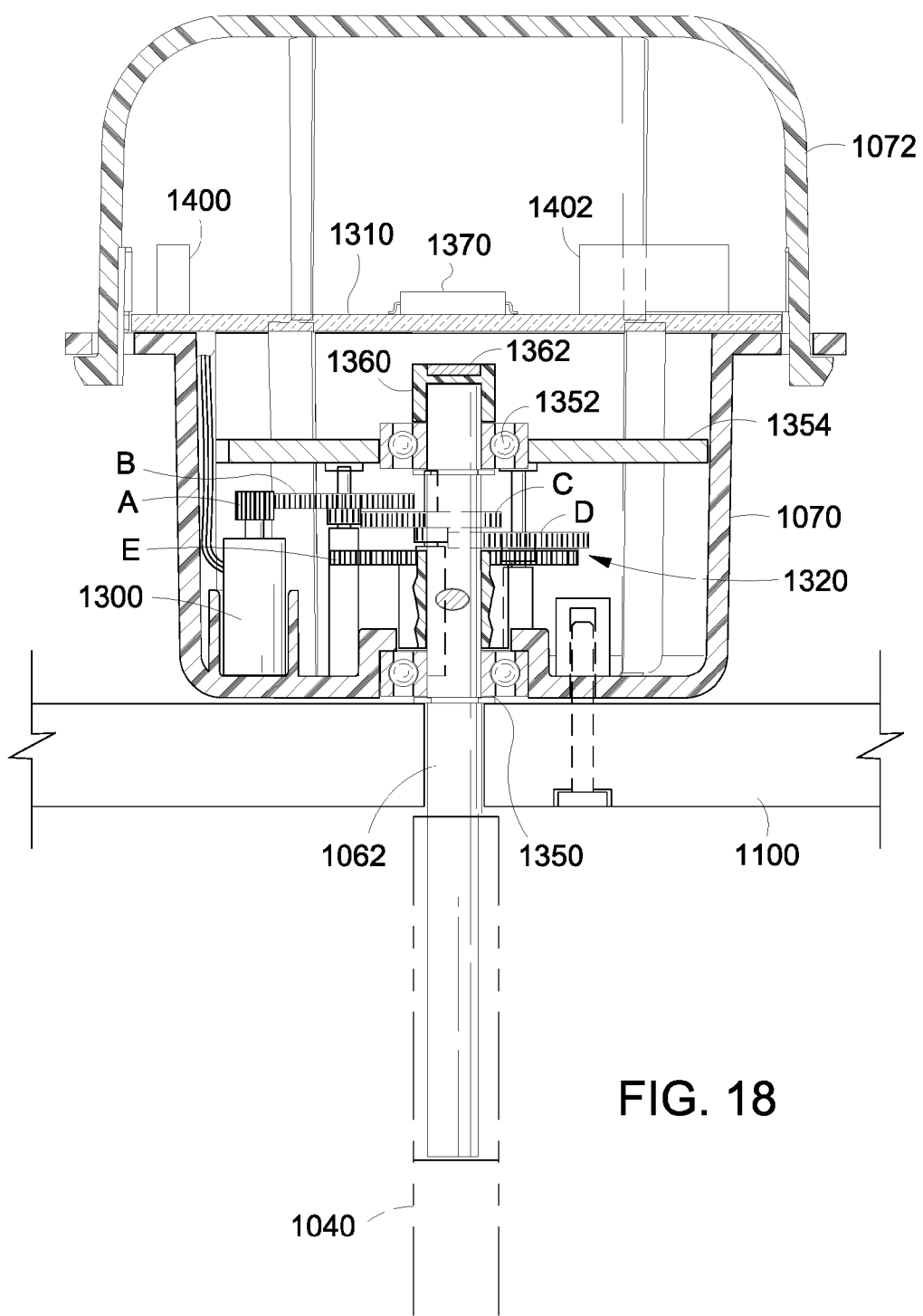
Figure 19:
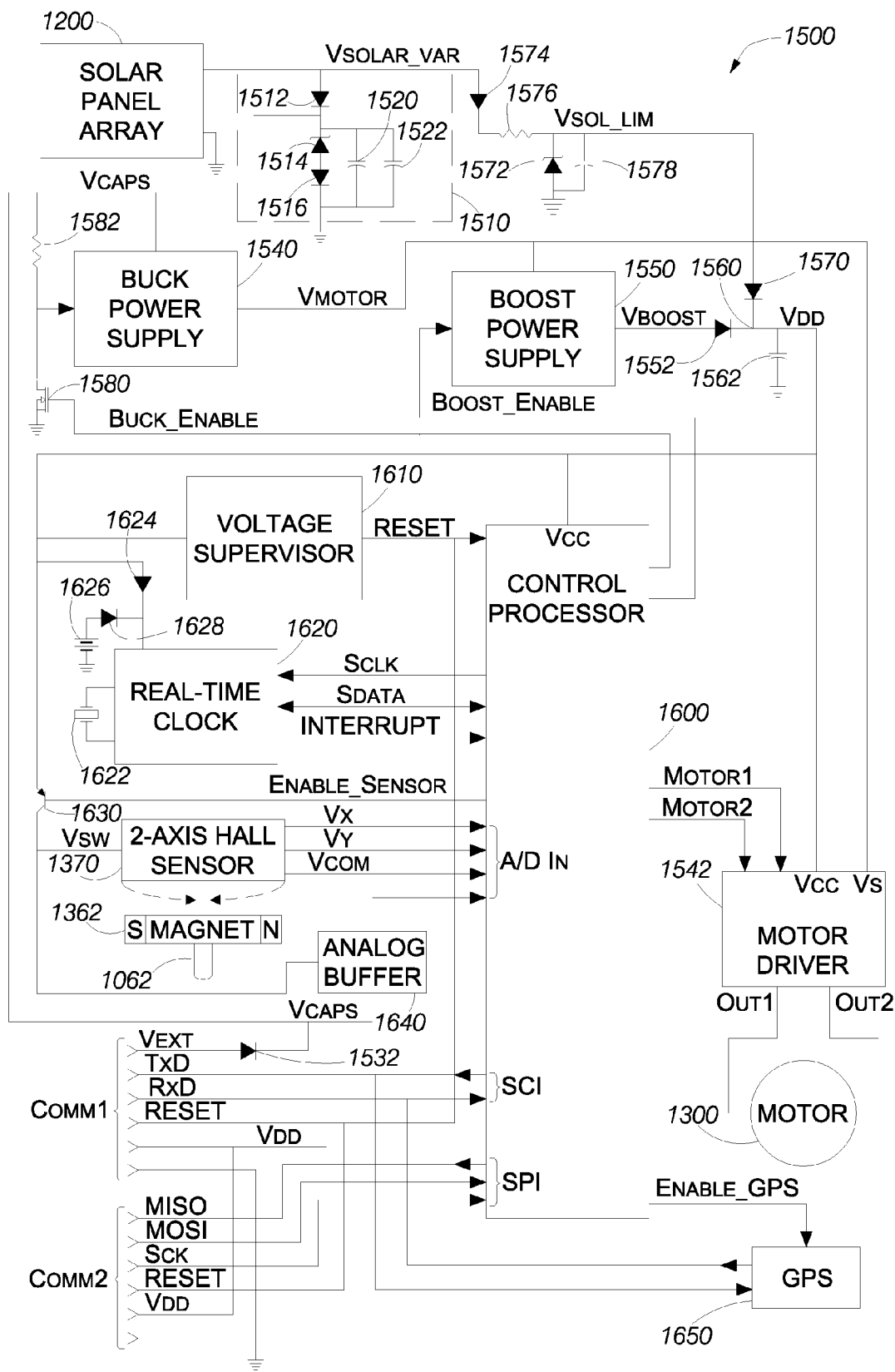
Figure 20A:
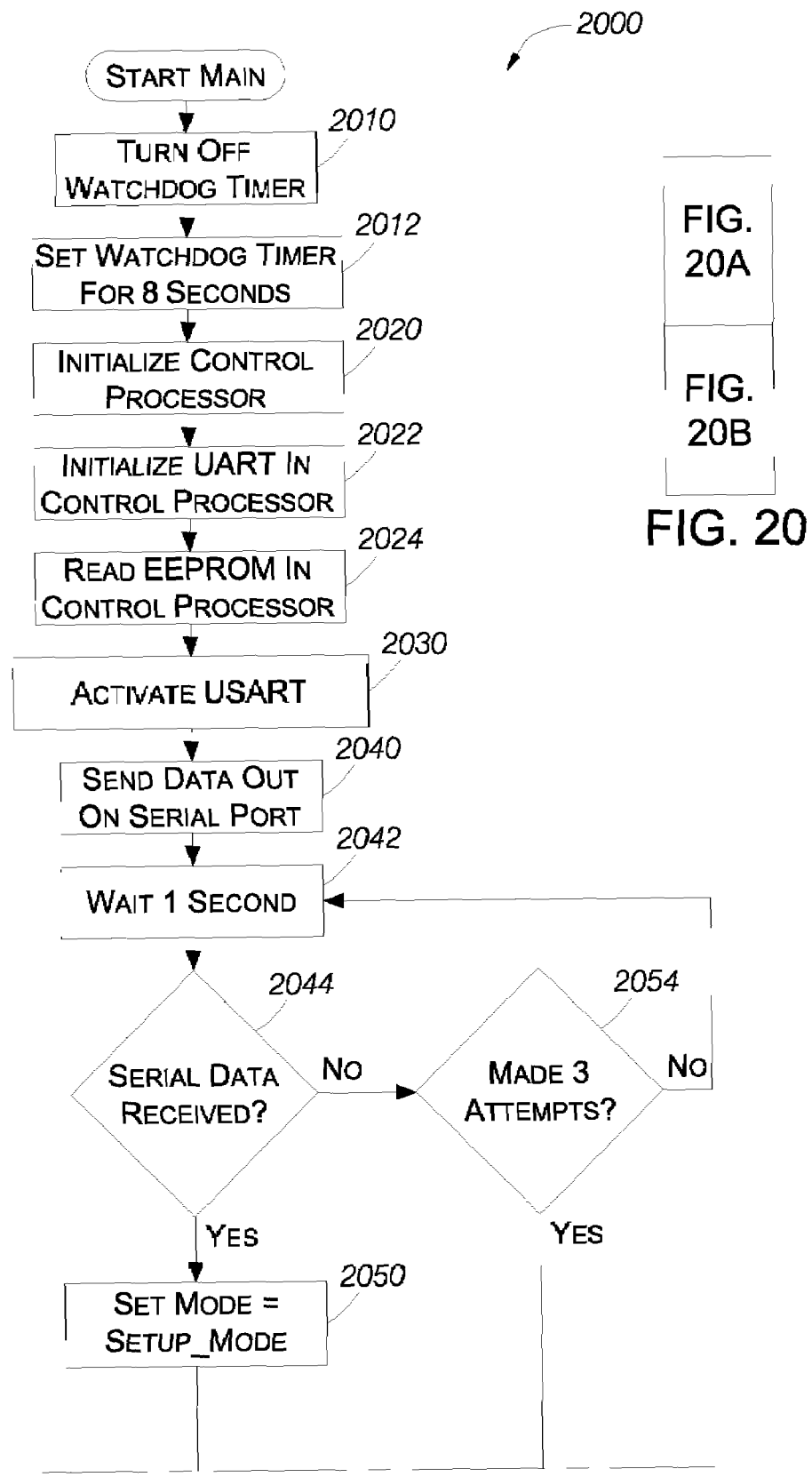
Figure 20B:
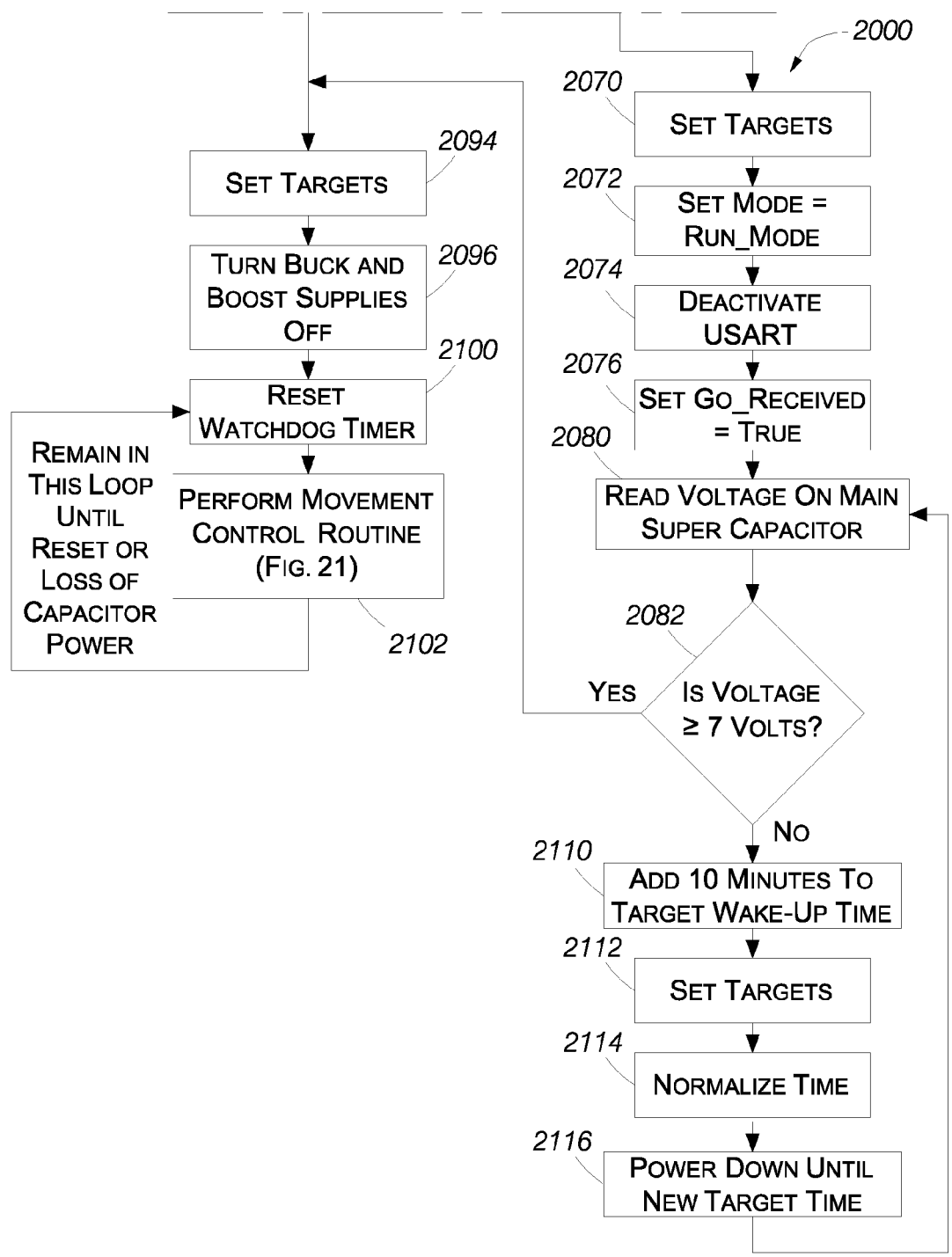
Figure 21A:
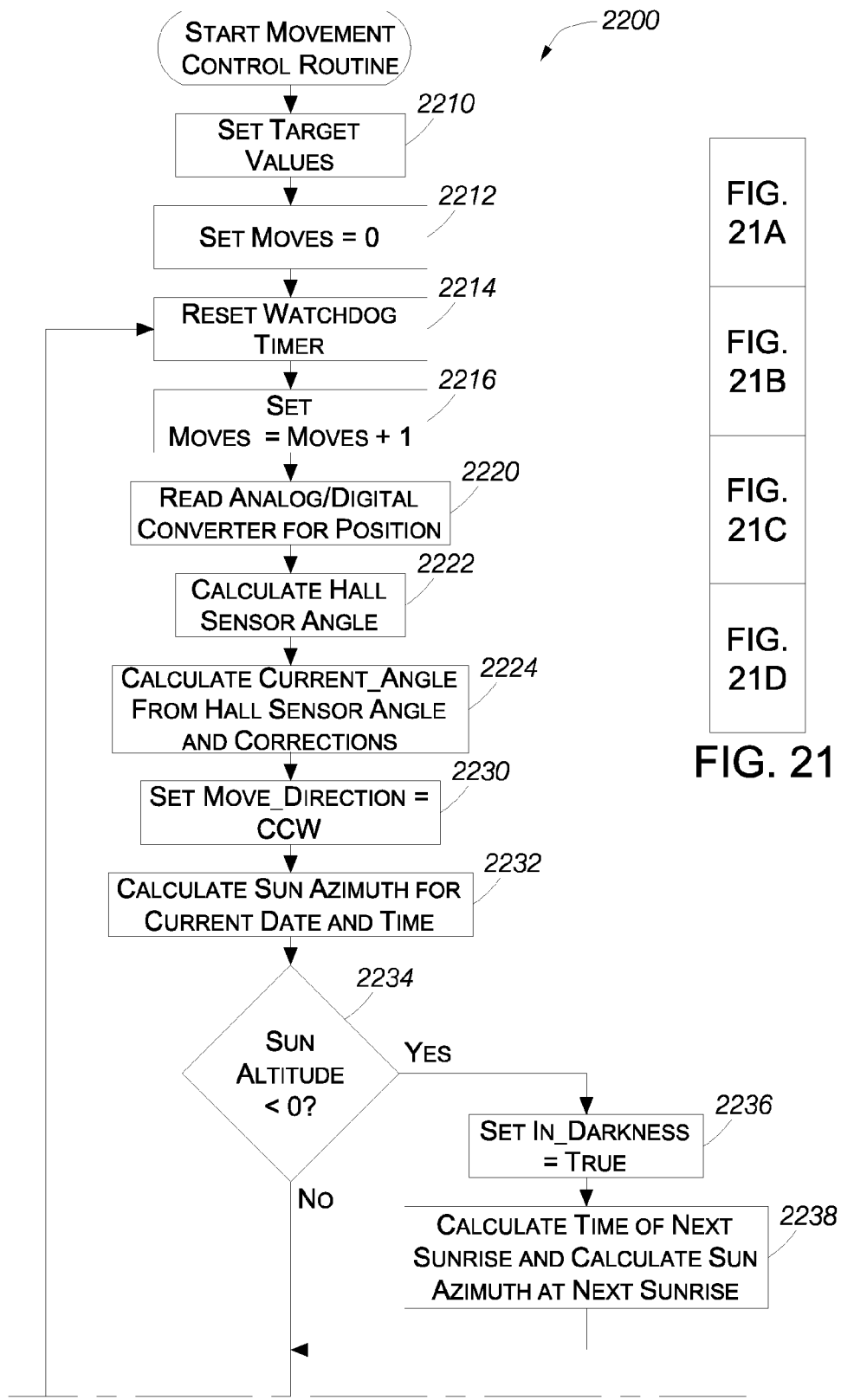
Figure 21B:
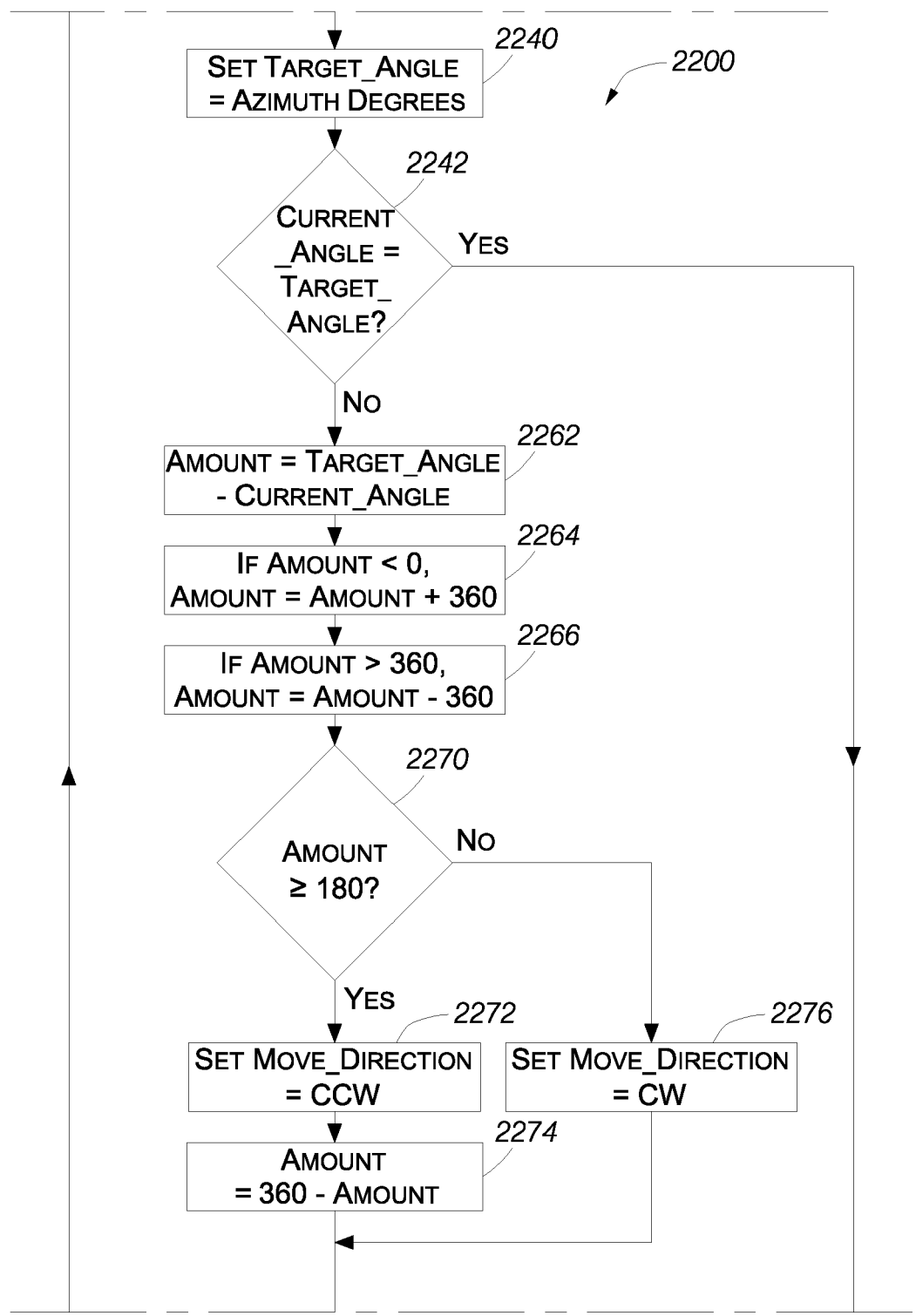
Figure 21C:
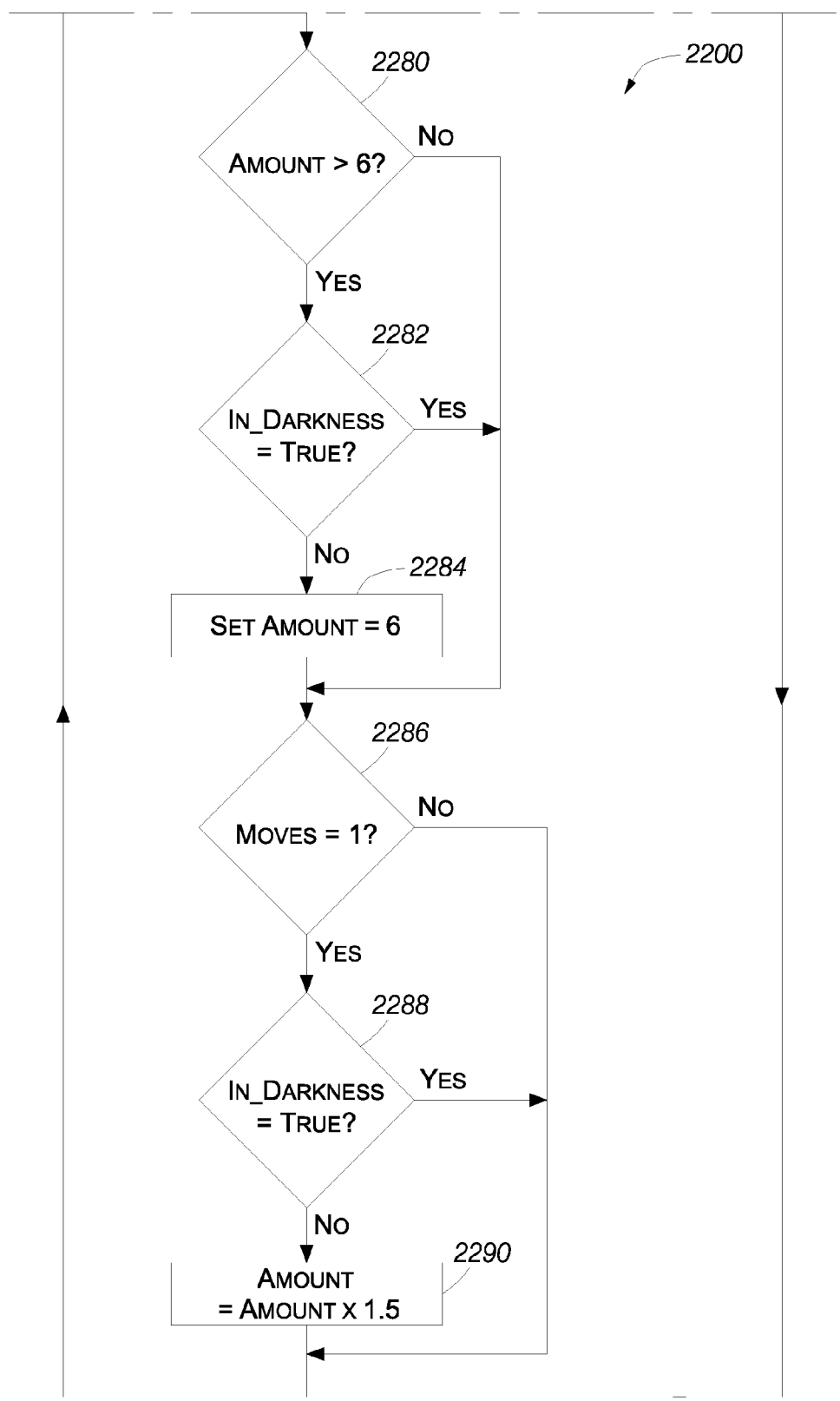
Figure 21D:
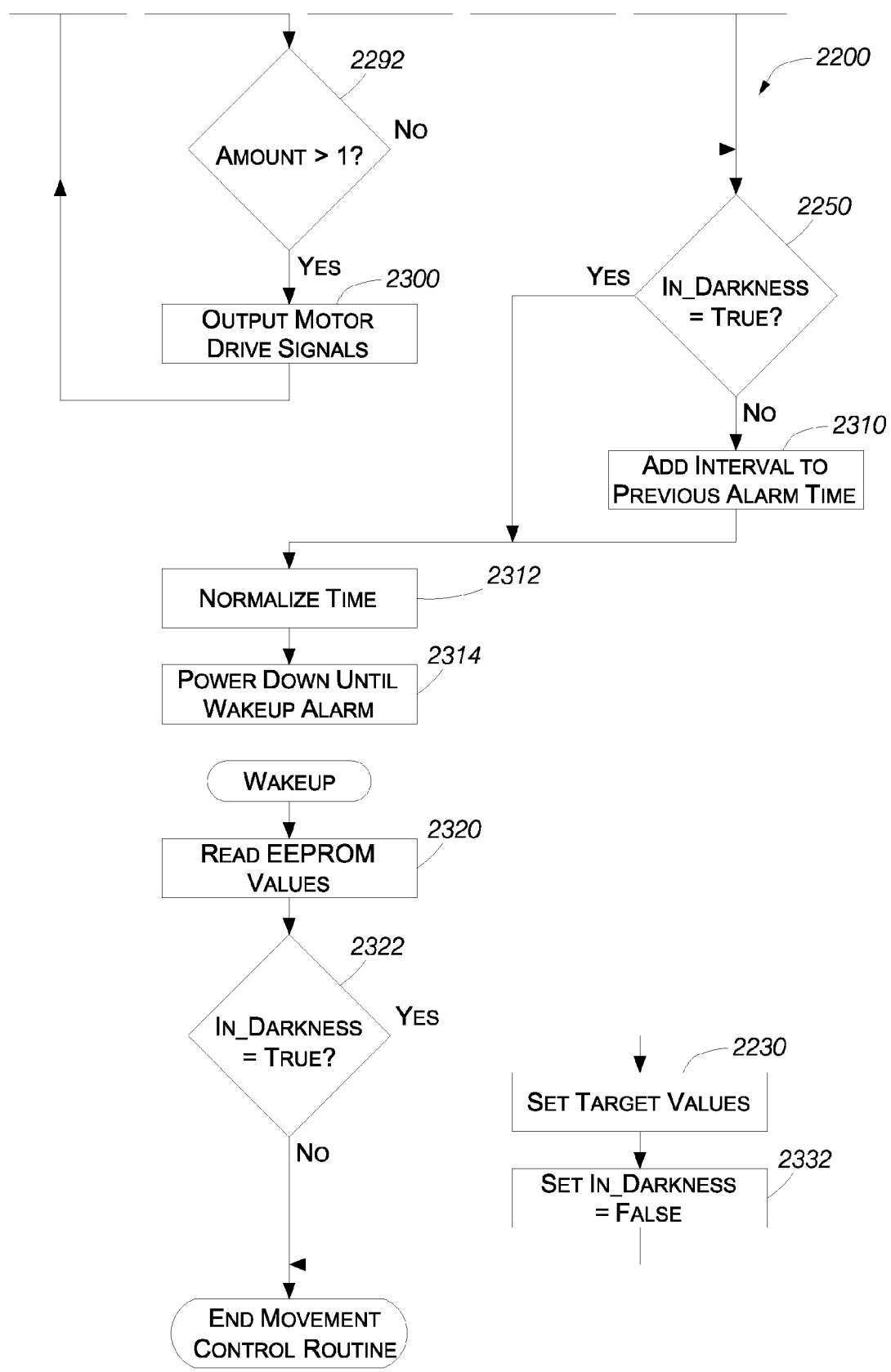
Figure 22:
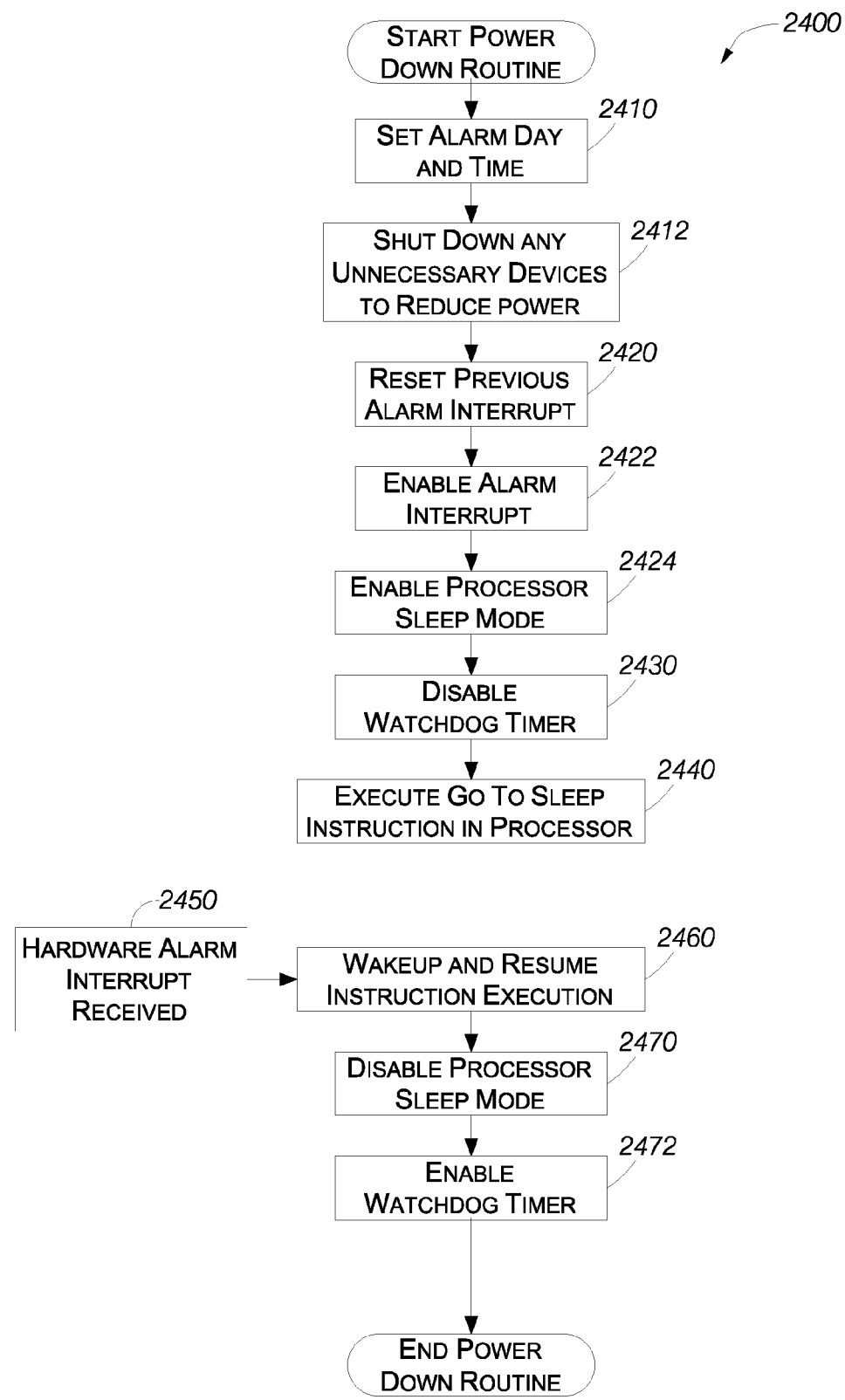

FIGS. 7A, 7B and 7C illustrate the effect of fast or slow rotation on the light sensed by the internal photodetector in the embodiment of FIG. 1, wherein FIG. 7A illustrates the rotating control box properly synchronized with the solar position, FIG. 7B illustrates the rotating control box in a position caused by rotating too fast, and FIG. 7C illustrates the rotating control box in a position caused by rotating too slowly;

FIG. 8 illustrates a flow chart of the operation of the electrical circuitry of FIG. 6 to correct the rotation rate;

FIG. 9 illustrates a flow chart of the operation of the electrical circuitry of FIG. 6 at startup to determine the hemisphere where the system is installed;

FIG. 10 illustrates a flow chart of the operation of the electrical circuitry of FIG. 6 in response to the level of charge of the power storage unit less than a predetermined level;

FIG. 11 illustrates the solar tracking system of FIG. 1 mounted on a pair of beams (shown in partial cross section) proximate a skylight with a transparent protective dome (shown in phantom) in position over the solar tracking system;

FIG. 12 illustrates a perspective view of a second embodiment in accordance with additional aspects of the present invention;

FIG. 13 illustrates a partially exploded perspective view of the embodiment of FIG. 12;

FIG. 14 illustrates an enlarged perspective view of the embodiment of FIGS. 12 and 13 further exploded to show the mounting of the control head shaft in the support post;

FIG. 15 illustrates a top plan view of the control head of FIGS. 12-14 partially broken away to show the internal motor and gearing arrangement;

FIG. 16 illustrates an exploded perspective view of the control head generally looking from above the control head;

FIG. 17 illustrates an exploded perspective view of the control head generally looking from below the control head;

FIG. 18 illustrates a cross-sectional view of the control head taken along the lines 18-18 in FIG. 15;

FIG. 19 illustrates a schematic block diagram of the electronic circuitry on the circuit board within the control head of FIGS. 12-17;

FIG. 20 (comprising FIGS. 20A and 20B) illustrates a main operational routine that is executed when the control processor of FIG. 19 is initially started from a reset condition;

FIG. 21 (comprising FIGS. 21A, 21B, 21C and 21D) illustrates the movement control routine that is called by the main routine of FIG. 20; and FIG. 22 illustrates the power down routine that is activated by the main routine of FIG. 20 and the movement control routine of FIG. 21.

DETAILED DESCRIPTIONS OF PREFERRED EMBODIMENTS

Figure 3:
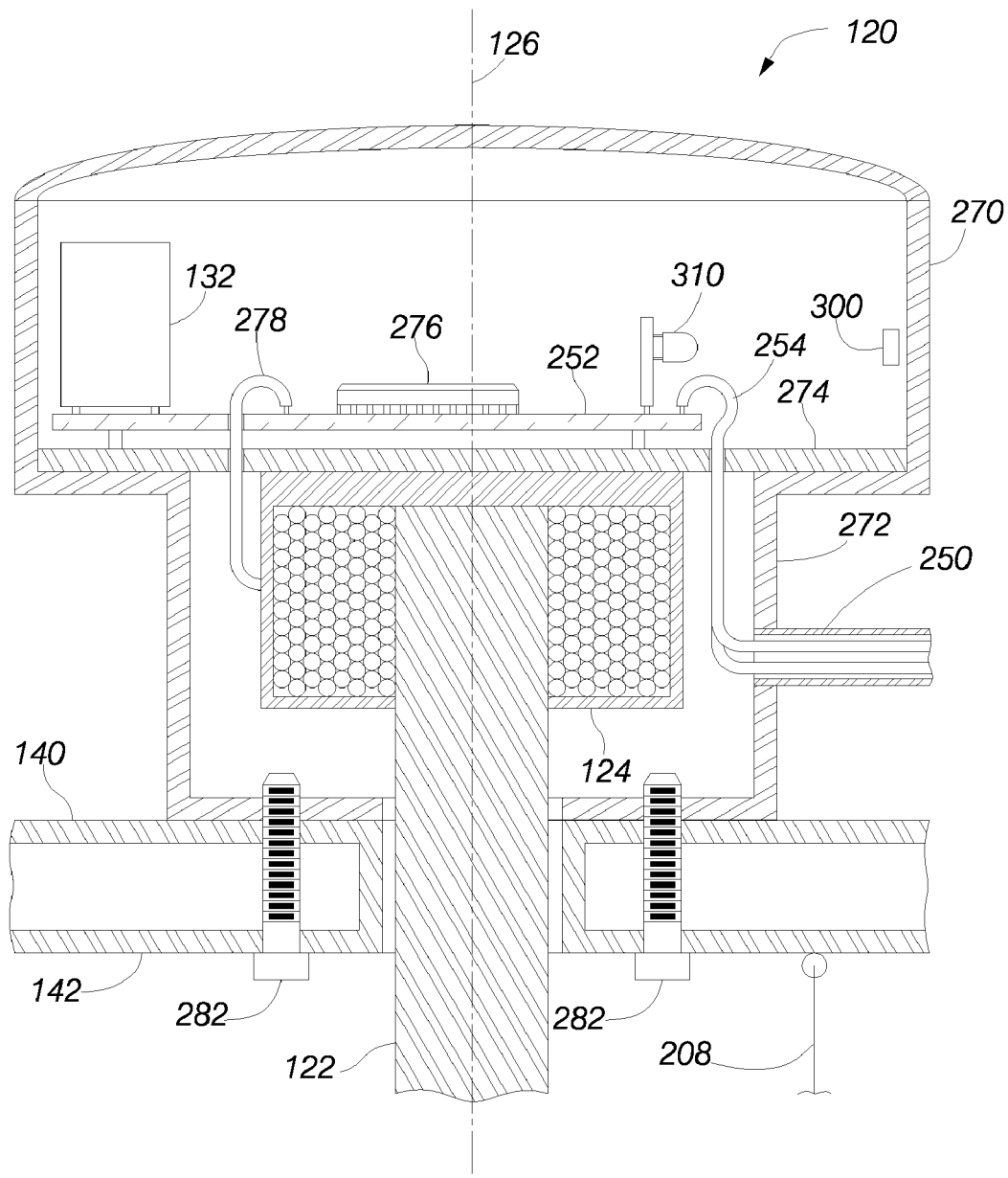
FIG. 3 illustrates an enlarged cross-sectional elevational view of the control box and a portion of the mirror support beam of FIG. 1.
Figure 4:
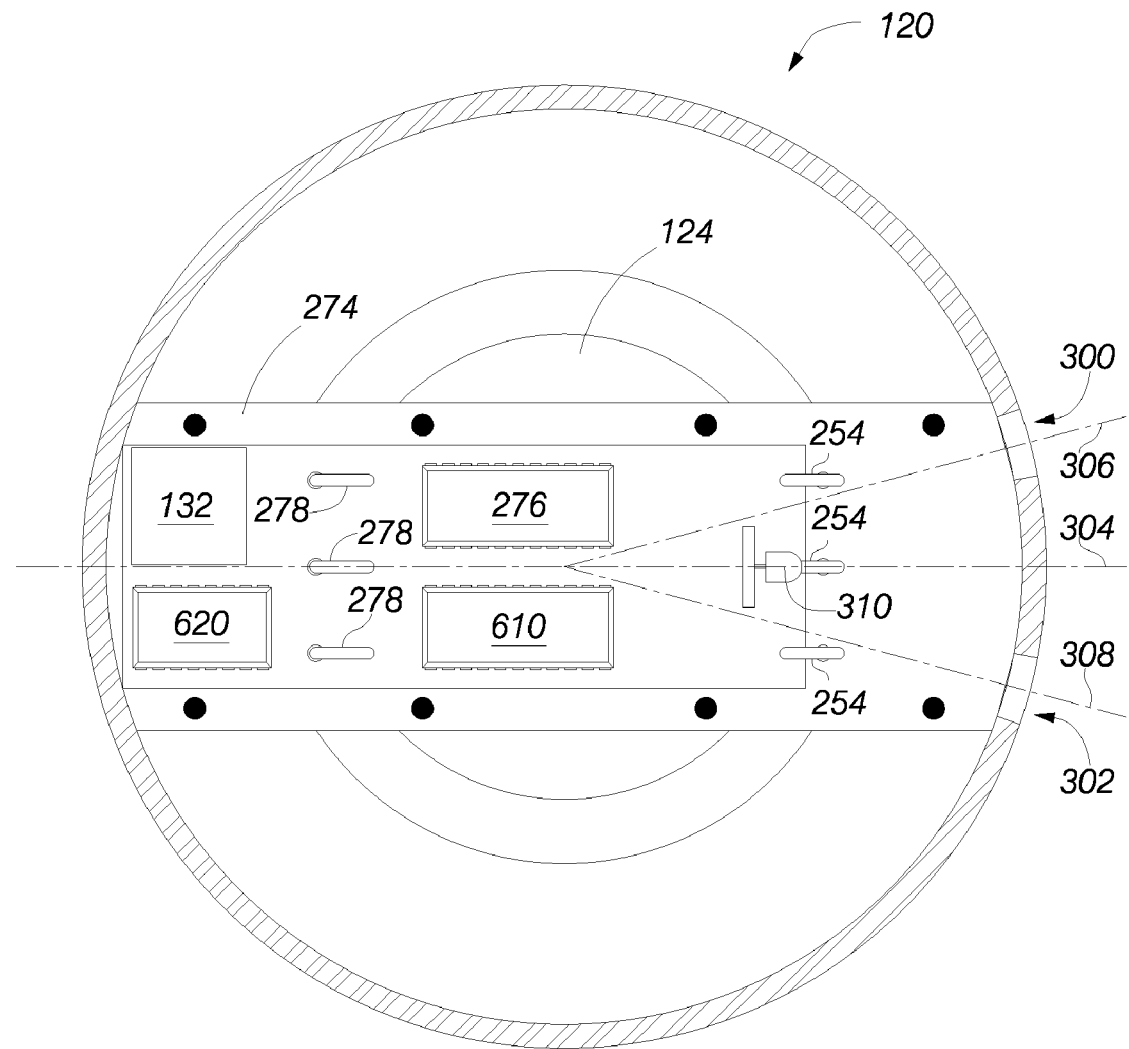
FIG. 4 illustrates cross-sectional plan view of the control box of FIG. 1.
Figure 5:
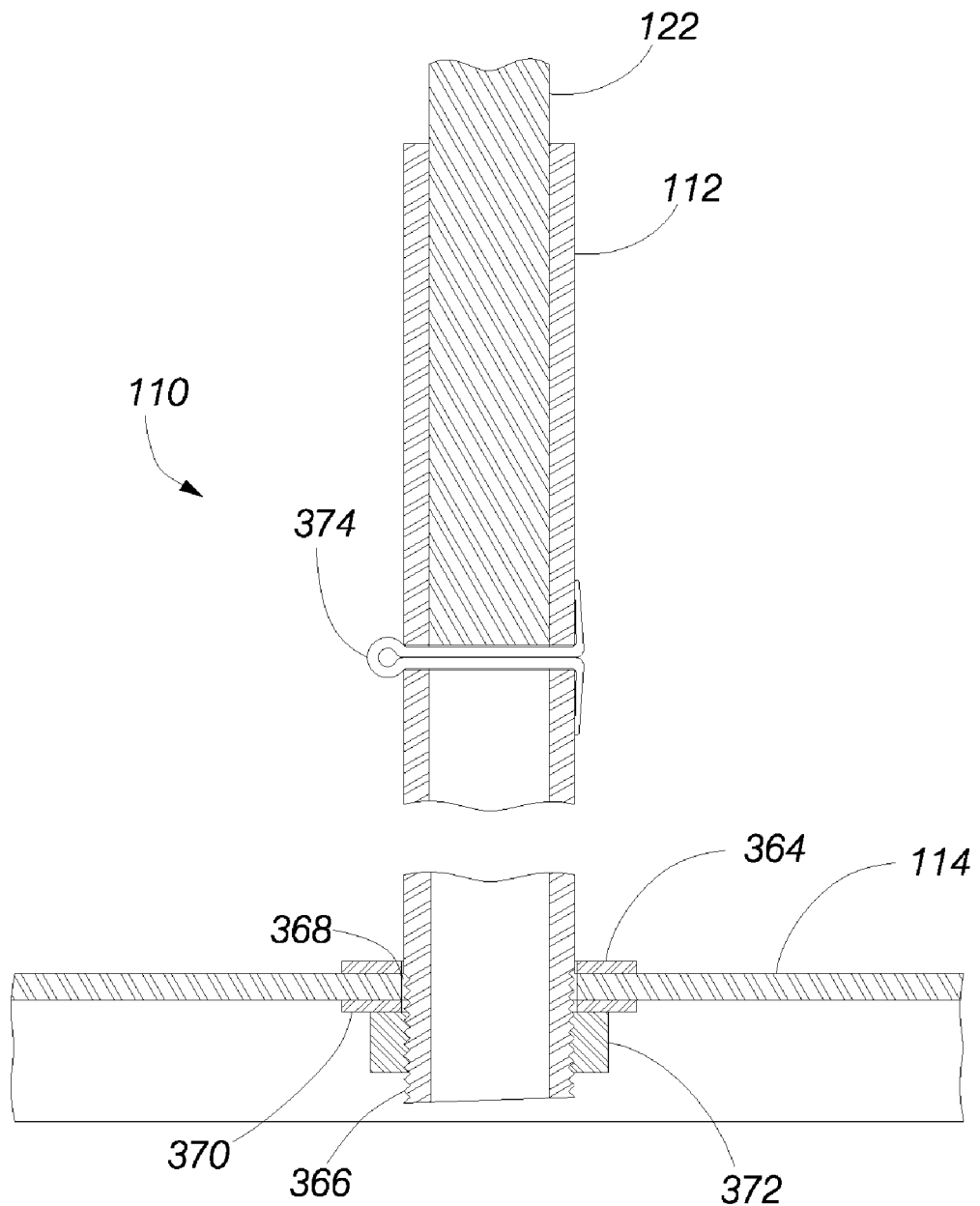
FIG. 5 illustrates an enlarged partial cross-sectional elevational view of the vertical support structure and the motor shaft of FIG. 1.

FIGS. 1-6 illustrate an embodiment of a solar tracking system 100. The solar tracking system includes a support structure 110, which comprises a vertical tube 112 mounted at the approximate midpoint of a horizontal beam 114. The beam includes a first mounting bracket 116 at one end and a second mounting bracket 118 at an opposite end. The mounting brackets are spaced apart by a distance corresponding to a distance across a conventional building skylight. Shorter or longer horizontal beams can be used for smaller or larger skylights. The support structure supports a control box 120 via a motor shaft 122 that extends vertically from the bottom of the control box. The lower end of the motor shaft is inserted into the upper end of the vertical tube as shown in FIG. 5. As shown in cross section in FIG. 3, a motor 124 within the control box causes the control box to rotate about a centerline 126 defined by the motor shaft.

A solar array 130 is coupled to the control box and rotates with the control box. As described below, the solar array generates electrical power for control circuitry and a drive motor. The electrical energy from the solar array is stored in an energy storage unit 132 shown in FIGS. 3 and 4.

A mirror support beam 140 is coupled to the control box and also rotates with the control box. A plurality of mirrors comprising a first mirror 150, a second mirror 152 and a third mirror 154 are supported by the mirror support beam. In the illustrated embodiment, the three mirrors are formed as generally planar surfaces; however, in alternative embodiments (not shown), the three mirrors may have mildly curved surfaces. In the following discussion, references to the planar surfaces of the mirrors should be understood to encompass the mildly curved surfaces of the alternative embodiments.

In the illustrated embodiment, the support beam 140 has a first generally horizontal portion 142 that is positioned below the control box 120 and extends rearward from the control box. In this description, "frontward" is defined as the peripheral portion of the control box in the direction toward the solar array 130 (to the right in FIG. 2), and "rearward" is defined in the opposite direction (to the left in FIG. 2). When the control box rotates, the first portion rotates in a horizontal plane (not shown). The support beam has a second portion 144 that extends frontward from the first portion and is disposed downwardly at an angle of approximately 20-25 degrees with respect to the horizontal plane in which the first portion rotates.

The first mirror 150 is disposed on the first portion 142 of the support beam 140 and is proximate the rearmost portion of the support beam. In the illustrated embodiment, an upper portion (e.g., approximately one-third of the height) of the first mirror extends above the support beam to an upper edge 160 and a lower portion (e.g., approximately two-thirds of the height) of the first mirror extends below the support beam to a lower edge 162. The relative sizes of the two portions of the first mirror are illustrative only and are not intended to be limiting.

The first mirror has a front surface 164 facing toward the control box 120 and has an opposite rear surface 166. The front surface is highly polished or coated to provide to cause the front surface to be highly reflective. The thickness of the first mirror between the front surface and the rear surface is selected to provide a sufficient strength without being overly heavy. For example, in the illustrated embodiment, the first mirror advantageously comprises aluminum or other suitable material having a thickness of approximately 2-10 millimeters.

Figure 2:
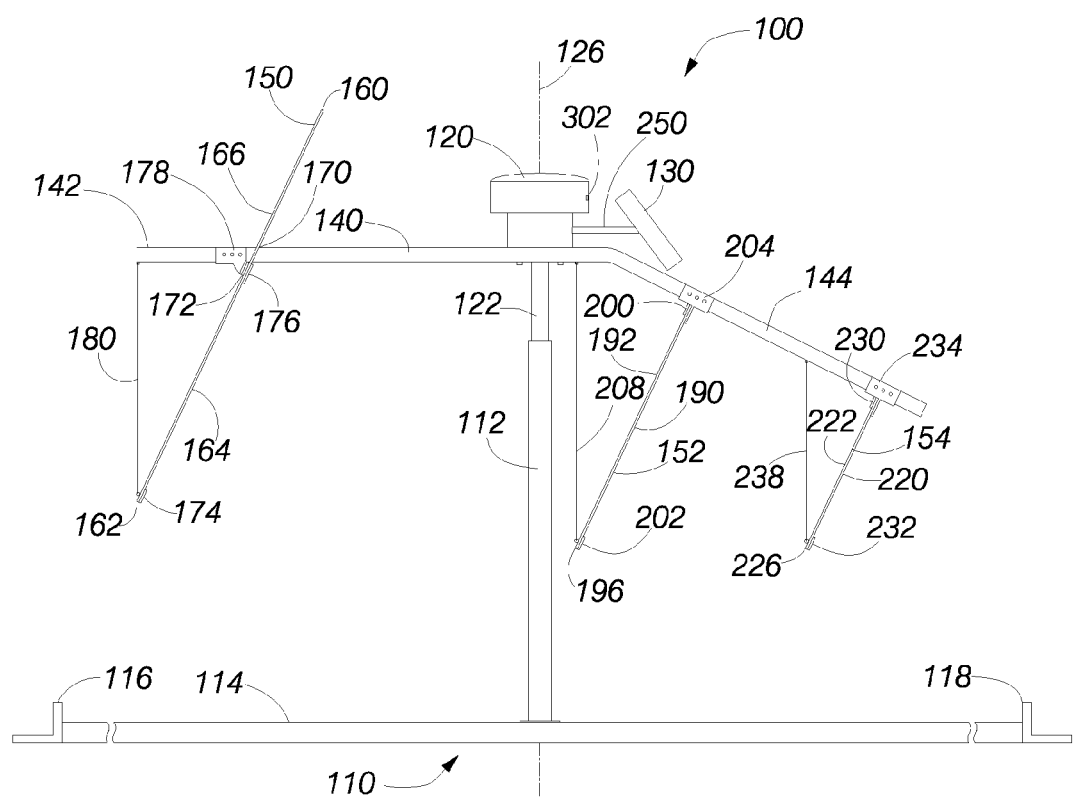
FIG. 2 illustrates an elevational view of the solar tracking system of FIG. 1.

In the illustrated embodiment, the first mirror 150 includes a hole 170 sized to allow the first portion 142 of the support beam 140 to pass through the mirror. The first mirror includes a first generally horizontal reinforcing strap 172 disposed across the rear surface below the hole 170. A second generally horizontal reinforcing strap 174 is disposed on the front surface proximate the lower edge 162. A shorter third horizontal reinforcing strap 176 is advantageously positioned on the front surface just below the hole. A mounting bracket 178 (FIG. 2) is mounted to the rear surface of the mirror below the hole in juxtaposition to the third reinforcing strap. The three reinforcing straps and the mounting bracket are attached to the first mirror by a plurality of suitable fasteners (e.g., rivets, screws, or the like) which pass through the thickness of the first mirror. As shown in FIG. 2, the mounting bracket is secured to the first portion of the support beam, which extends through the hole.

As shown more clearly in the elevational view of FIG. 2, the first mirror 150 is disposed at an angle of approximately 20-25 degrees with respect to vertical such that the lower edge 162 is farther from the centerline 126 than the upper edge 160. A cable 180 extends downwardly from the rearmost portion of the first portion 142 of the support beam 140 to the lower edge of the first mirror to provide additional support to maintain the first mirror at the desired angle. The lowermost end of the cable is secured to the second reinforcing strap 174 through the thickness of the first mirror.

The second mirror 152 and the third mirror 154 are supported by the second portion 144 of the support beam 140. As illustrated, the second and third mirrors are each generally perpendicular to the second portion of the support beam. Since the second support beam is disposed at an angle of 20-25 degrees with respect to the horizontal plane, the first and second mirrors are disposed at respective angles of 20-25 degrees with respect to vertical. Thus, the second and third mirrors are generally parallel to the first mirror 150 in the illustrated embodiment. In alternative embodiments (not shown), the three mirrors can be disposed at different angles with respect to vertical.

The second mirror 152 is positioned on the second portion 144 of the support beam 140 close to the juncture of the second portion with the first portion 142. The second mirror has a reflective front surface 190 and a rear surface 192, which are disposed between an upper edge 194 and a lower edge 196. The lower edge is closer to the centerline 126 than the upper edge. The rear surface faces toward the control box 120, and the front surface faces away from the control box.

A first generally horizontal reinforcing strap 200 extends across the rear surface 192 of the second mirror 152 proximate the upper edge 194. A second reinforcing generally horizontal reinforcing strap 202 extends across the front surface 190 proximate the lower edge 196. The upper edge 194 is attached to the second portion 144 of the support beam 140 by a mounting bracket 204, which is disposed on the front surface of the mirror opposite the first reinforcing strap. The reinforcing straps and the mounting bracket are attached to the second mirror by a plurality of suitable fasteners (e.g., rivets, screws, or the like) which pass through the thickness of the second mirror. A cable 208 extends downwardly from a forwardmost portion of the first portion 142 of the support beam to the lower edge of the second mirror to provide additional support to maintain the second mirror at the desired angle. The cable 208 is secured to the second reinforcing strap through the thickness of the mirror.

The third mirror 154 is positioned on the second portion 144 of the support beam 140 proximate a forwardmost end of the second portion. The third mirror has a reflective front surface 220 and a rear surface 222, which are disposed between an upper edge 224 and a lower edge 226. The lower edge is closer to the centerline 126 than the upper edge. The rear surface faces toward the control box 120, and the front surface faces away from the control box.

A first generally horizontal reinforcing strap 230 extends across the rear surface 222 of the third mirror 154 proximate the upper edge 224. A second reinforcing generally horizontal reinforcing strap 232 extends across the front surface 220 proximate the lower edge 226. The upper edge 224 is attached to the second portion 144 of the support beam 140 by a mounting bracket 234, which is disposed on the front surface of the mirror opposite the first reinforcing strap. The reinforcing straps and the mounting bracket are attached to the third mirror by a plurality of suitable fasteners (e.g., rivets, screws, or the like) which pass through the thickness of the second mirror. A cable 238 extends downwardly from the second portion of the support beam at a position on the second portion between the second mirror 152 and the third mirror. The cable 238 extends to the lower edge of the third mirror to provide additional support to maintain the third mirror at the desired angle. The cable 238 is secured to the second reinforcing strap through the thickness of the mirror. The angles of the mirror can be adjusted during installation.

As illustrated in FIG. 2, the angle of the second portion 144 of the mirror support beam 140 causes the upper edge 194 of the second mirror 152 to be substantially lower than the upper edge 160 of the first mirror 150. Thus, a substantial portion of the area of the front surface of the first mirror is exposed to sunlight even when the sunlight impinging on the mirrors is arriving at a small angle to a horizontal plane. Similarly, the upper edge 224 of the third mirror 154 is lower than the upper edge of the second mirror so that a substantial portion of the area of the front surface of the second mirror is exposed to sunlight when the sunlight arrives at a small angle to the horizontal plane.

The solar array 150 extends forwardly from the control box 120 and is coupled to the control box by a generally horizontal hollow support structure 250. In the illustrated embodiment, the hollow support structure comprises a cylindrical tube. The solar array produces electrical power at a voltage in a range of 10-20 volts. As shown in the cross-sectional illustrations in FIGS. 3 and 4, the electrical power is coupled to a circuit board 252 via a plurality of power wires 254. As further illustrated in FIGS. 3 and 4, the circuit board includes the electrical energy storage device 132. In the preferred embodiment, the energy storage device is a super-capacitor, which stores a sufficient charge to operate the electrical control circuitry and the motor 124 for at least 15 days in the absence of sufficient sunlight to enable the solar array to recharge the storage device.

As shown in the cross-sectional view of FIGS. 3 and 4, the control box 120 includes an upper portion 270 and a lower portion 272. The motor 124 is located in the lower portion and is secured to the control box by a mounting bracket 274. In the illustrated embodiment, the motor is controlled at a uniform rate by motor control circuitry 276 represented by an integrated circuit on the circuit board 252. The motor is coupled to the circuit board by a plurality of wires 278. The motor includes the motor shaft 122 that extends downwardly through an opening in the bottom of the control box and further extends through an opening in the first portion 142 of the support beam 140. The lower portion of the control box is secured to the support beam by suitable fasteners, such as, for example a pair of machine screws 282 illustrated in FIG. 3.

In FIG. 3, the motor 124 is illustrated as a basic motor that drives the motor shaft 122 directly. It should be understood that the motor may advantageously include an internal gear assembly (not shown) that reduces the rotation rate of the motor by a suitable ratio to obtain the desired rotation rate of one revolution per day at the motor shaft.

As shown in FIGS. 1 and 4, the upper portion 270 of the control box 120 includes a first opening 300 and a second opening 302, which are disposed on opposite sides of a horizontal system centerline 304 (FIG. 4) that is parallel to the support beam 140 and the hollow support structure 250. In the illustrated embodiment, the respective centers of the two openings are disposed on respective centerlines 306 and 308 emanating from the center of the control box at respective angles of approximately 15 degrees with respect to the system centerline. Thus, the centerlines of the two openings are approximately 30 degrees apart in angular distance. As further shown in FIGS. 3 and 4, a photodetector 310 is mounted on the circuit board 252 at a location approximately on the system centerline. As illustrated in more detail in connection with FIGS. 7A, 7B and 7C, the position of the photodetector with respect to the openings causes the photodetector to be shaded from sunlight when the system centerline is directed toward the sun. On the other hand, when the centerline of one of the openings is directed toward the sun, the photodetector is exposed to sunlight. The operation of the control circuitry in response to the exposure of the photodetector is also discussed below in connection with FIGS. 7A, 7B and 7C.

FIG. 5 illustrates an enlarged partial cross-sectional elevational view of the vertical support structure 110 and the motor shaft 122 of FIG. 1. The vertical support structure comprises the hollow tube or pipe 112 that is mounted on the generally horizontal beam 114. As shown in FIG. 1, the beam extends between the first mounting bracket 116 and the second mounting bracket 118 shown in FIG. 1 and in FIG. 11. As described below with respect to FIG. 11, when the solar tracking system 100 is installed on a roof over a skylight, the mounting brackets are secured to structural support members proximate the skylight. As shown in the cross-sectional view of FIG. 5, the hollow tube is secured to the midpoint of the beam in a suitable manner. For example, in the illustrated embodiment, the hollow tube includes a fixed collar 364 proximate a threaded lower portion 366. The threaded lower portion is inserted through a hole 368 in the beam and secured by a washer 370 and a nut 372. In another embodiment (not shown), the hollow tube may be permanently welded to the beam.

The upper portion of the hollow tube 112 receives the lower end of the motor shaft 122. The inside diameter of the hollow tube is sized to provide a snug fit with the outside diameter of the motor shaft. A cotter pin 374 or other generally horizontal device is inserted through the hollow tube at a selected location to provide a support for the end of the motor shaft to maintain the motor shaft at a fixed vertical position in the hollow tube. The vertical position of the shaft in the hollow tube is determined by the length of the motor shaft, the height of the hollow tube and the desired height of the mirrors above the horizontal beam 352.

In view of the foregoing description of the structure of the solar tracking system, it should be understood that when the motor 124 is operated, the shaft 280 turns relative to the motor and the control box 120. However, since the shaft 280 is confined by the snug engagement with the hollow tube 350, the shaft is unable to turn with respect to the vertical support structure 110. Rather, the relative rotation of the motor shaft and the motor causes the motor and the attached control box to rotate with respect to the vertical support structure. As discussed above, the rotation rate is controlled by control circuitry on the circuit board 252 so that the control box completes one revolution per day (e.g., 360 angular degrees per day). Thus, the relative rotation of the motor shaft and the motor is 15 degrees per hour or 1 degree every 4 minutes.

FIG. 6 illustrates a block diagram 600 of the electrical circuitry of the control box of FIG. 1. The electrical circuitry includes the motor 124, the solar array 130, the electrical energy storage device 132, and the photodetector 310 that were discussed above. The electrical circuitry further includes the motor control circuitry 276, which receives control signals from a system control circuit 610. The motor control circuitry is responsive to the control signals from the system control circuit 610 to selectively apply power from the electrical energy storage device to the windings of the motor to cause the motor to rotate (e.g., step) by a predetermined angular distance. The electrical circuitry further includes a power control circuit 620 that receives the electrical power produced by the solar array, conditions the power, and selectively applies the power to charge the energy storage device. The power control circuit further monitors the energy stored in the energy storage device to determine when the charge is less than a predetermined lower limit and to provide a low-power level signal to the system control circuit to indicate that the charge is less than the lower limit.

The system control circuit 610 is responsive to the signal from the power control circuit 620 and responsive to the signal produced by the photodetector 310 when the photodetector is activated by sunlight. When the system control circuit receives the low-power level signal from the power control circuit that indicates that the energy stored in the energy storage device is less than the predetermined level, the control circuit performs a fail-safe routine (described below) to rotate the control box 120 to a predetermined location and to stop all rotation until the power control circuit deactivates the low-power level signal.

The system control circuit 610 is responsive to the signal from the photodetector 310 to adjust the position of the control box 120 so that the solar array 130 and the mirrors 150, 152, 154 are facing the sun and so that the photodetector is shaded from sunlight. The operation of the system control circuit is illustrated by the partial plan cross-sectional views in FIGS. 7A, 7B and 7C and by the flow diagrams in FIG. 8. In particular, FIGS. 7A, 7B and 7C illustrate the effect of fast or slow rotation on the light sensed by the internal photodetector. FIG. 7A illustrates the rotating control box properly synchronized with the solar position. As illustrated in FIG. 7A, the control box 120 is facing the sun so that the sunlight (represented by a plurality of phantom lines) passes through the first opening 300 and through the second opening 302. The photodetector 310 is positioned directly behind the portion of the wall of the control box between the two openings and is shaded from the sunlight passing through both openings. The photodetector is shaded from sunlight during most of the day and is only active for short durations while the system is performing the correction operations described below. Thus, the rate of any degradation of the photodetector that may be caused by exposure to intense sunlight is substantially reduced because of the short exposure times.

FIG. 7B illustrates the rotating control box in a position caused by rotating too fast. In particular, the control box has advanced to an angular position approximately 15 degrees ahead of the angular position of the sun such that the first opening 300 is generally facing toward the sun. Thus, the sunlight passing through the first opening impinges directly on the photodetector 310 and cause the photodetector to be active. The active photodetector activates the photodetector signal to the system control unit 610 to indicate that the control box is no longer correctly positioned. The response of the system control unit to the active photodetector signal is described below.

FIG. 7C illustrates the rotating control box in a position caused by rotating too slowly. In particular, the control box has regressed to angular position approximately 15 degrees behind the angular position of the sun such that the second opening 302 is generally facing toward the sun. Thus, the sunlight passing through the second opening impinges directly on the photodetector 310 and cause the photodetector to be active. The active photodetector activates the photodetector signal to the system control unit 610 to indicate that the control box is no longer correctly positioned. The response of the system control unit to this active photodetector signal is described below.

As indicated above, sunlight impinging on the photodetector 310 through either the first opening 300 or the second opening 302 causes the photodetector to provide an active photodetector signal to the control unit 610. Although the active photodetector signal indicates that one of the openings is facing the sun, the active photodetector signal does not indicate which of the two openings if facing the sun. Thus, the system control unit initiates a search routine 800 illustrated in FIG. 8.

The search routine 800 begins in a block 810 wherein the system control unit increases the angular rotation rate of the motor 124 by sending a control signal to the motor control circuitry 276. For example, the rotation rate may be advantageously increased from one revolution per day to one revolution per hour.

The system control unit initially assumes that the original rotation rate of the motor was too slow and that the light impinging on the photodetector 310 is passing through the second opening 302, as illustrated in FIG. 7C. Thus, the increased rotation rate will cause the control box to advance relatively rapidly so that the sunlight is first blocked by the outer wall of the control box between the two openings. The system control unit waits in a block 812 until the photodetector becomes inactive, and the enters a decision sequence comprising a first decision block 814, which checks to determine whether the photodetector signal has again become active. If the photodetector signal is active, the system control unit sets a "slow" status flag and proceeds to a procedure block 816, which is described below. If the photodetector signal is not yet active, the system control unit checks whether the motor has rotated more than 30 degrees in a decision block 818. If the motor has not rotated 30 degrees, the system control unit returns to the decision block 814 and continues checking.

If the motor 124 has rotated 30 degrees without the photodetector signal becoming active, the control box 120 is rotating in the wrong direction. Accordingly, the original opening that was passing the sunlight to the photodetector 310 was not the first opening 300 as assumed. Rather, the sunlight must have been passing through the second opening 302 as shown in FIG. 9C. Thus, the system control unit proceeds from the decision block 818 to a block 820 wherein the system control unit issues a control signal to the motor control circuitry 276 to cause the motor control circuitry to reverse the rotation direction of the motor and start moving the control box in the original rotation direction toward the second opening.

After initiating the rotation in the original direction, the system control unit 810 proceeds to a block 822 to rotate the motor 124 for 30 degrees in the new direction so that the photodetector signal is again active because of the sunlight passing through the second opening 302 in the control box 120. The system control unit then waits in a block 824 for the photodetector to deactivate the photodetector signal. When the system control unit detects the deactivation of the photodetector signal, the system control unit proceeds to a decision sequence to wait for the photodetector to detect sunlight through the first opening 300.

In a decision block 830, the system control unit 610 checks to determine whether the photodetector signal has again become active. If the photodetector signal is active, the system control unit sets a "fast" status flag and proceeds to the procedure block 816, which is described below. If the photodetector signal is not yet active, the system control unit checks whether the motor 124 has rotated more than 30 degrees in a decision block 832. If the motor has not rotated 30 degrees, the system control unit returns to the decision block 830 and continues checking. If the motor rotates 30 degrees without the photodetector signal becoming active, the system control unit proceeds from the decision block 832 to an alarm block 834. The alarm block 834 advantageously comprises routines to recover from this condition, which should not occur during normal operations. Since the sunlight may be occluded by heavy clouds during the foregoing routine, in one embodiment, the system control unit waits a predetermined time and then resumes the search foregoing search routine with a broader angular search range.

When the system control unit 610 enters the procedure block 816, the system control unit knows which opening is currently facing the sun and knows the direction in which to rotate the control box 120 so that the portion of the wall between the two openings faces the sun and shades the photodetector 310 as illustrated in FIG. 7A. According, the system control unit sends a signal to the motor control circuitry 276 to cause the motor 124 to rotate approximately 15 degrees in the correct direction. The system control unit then sends a signal to the motor control circuitry to adjust the original rotation rate to a slower rotation rate if the "fast" status signal is set or to a faster rotation rate if the "slow" status signal is set. The system control unit then waits for the photodetector signal to become active before again performing the foregoing routine.

FIG. 9 illustrates an automatic system startup routine 850. The system control circuit 610 is preprogrammed with an initial rotation speed that is reasonably close to the expected rotation speed required to properly track the apparent movement of the sun; however, the directions of the apparent movement of the sun in the southern hemisphere and the northern hemisphere are opposite each other. Thus, the system control circuit must determine which direction is the proper rotation direction when the system is first installed. Accordingly, system control circuit receives a third status flag identified as the "startup" flag. The startup flag is set whenever power is initially applied to the system, either at initial installation or when sunlight is blocked by clouds or other causes for a sufficient time to completely deplete the energy in the energy storage unit 132.

In a block 852 and a block 854, the system control circuit first positions the control box 120 so that the photodetector 310 is shaded from sunlight in accordance with the movements described in connection with FIG. 8. In particular, in the block 852, the system control circuit sends control signals to the motor control circuitry 276 and monitors the output signal from the photodetector to locate the first opening 300 and the second opening 302. Then, in the block 854, the system control circuitry sends control signals to the motor control circuit to move the control box to a position where a point midway between the two openings is facing the sun and then stop in that position.

In a block 856, the system control circuit waits for approximately one hour (corresponding to an angular movement of 15 degrees) for the apparent movement of the sun to cause sunlight to pass through one of the openings. Then, in a block 858, the system control circuit performs steps similar to the steps described above to identify the opening through which the sunlight passed to impinge on the photodetector. If the system control unit determines that the sunlight passed through the second opening, the system control unit determines that the solar tracking system is located in the northern hemisphere. Thus, in a block 860, the system control circuit sends a control signal to the motor control circuitry to activate clockwise rotation of the control box. If the system control unit determines that the sunlight passed through the first opening, the system control unit determines that the solar tracking system is located in the southern hemisphere. Thus, in a block 862, the system control circuit sends a control signal to the motor control circuitry to activate counterclockwise rotation of the control box.

FIG. 10 illustrates a routine 900 that is performed when the power control circuit 620 activates the signal to the system control circuit 610 to indicate that the stored energy is less than the predetermined limit. The power control circuit also provides a signal to the system control circuit to indicate when the solar array 130 is actively producing electrical energy. The system control circuit includes a timing circuit that enables the system control unit to track the current angular location of the control box 120. Thus, the system control circuit is able to identify and store the angular locations that correspond to the sunrise and sunset of the last day when sufficient sunlight was available to enable the solar array to produce electrical energy. It should be understood that the system control circuit does not store angular locations that correspond to a significantly shorter range of daylight than for a previously stored day since the angular positions of the sunrises and sunsets do not differ greatly from day to day. A significant change in the angular location of the control box at sunrise or sunset of the current day may indicate significant cloud cover that blocks sufficient light from reaching the solar array.

When the system control circuit 610 receives the low-energy signal from the power control circuit 620, the system control circuit performs a routine in a block 902 to retrieve the locations of the control box 120 at the previous sunrise and the previous sunset beginning and the end of the last solar day. Then, in a block 904, the system control unit calculates the location of the control box at midday of the last solar day. In a block 906, the system control circuit calculates the angular movement required to advance the control box so that the solar array faces the sun at the calculated midday location. In a block 908, the system control unit then issues a control signal to the motor control unit 276 to cause the motor 124 to rotate by the required angular movement and then stop. In a decision block 910, the system control unit waits until the low-energy level signal is deactivated by the power control circuit. During a day with a moderate amount of sunlight (e.g., scattered or no clouds), the solar array 130 rapidly charges the energy storage device 132 to a sufficient energy level to resume normal operations wherein the solar array continues to charge the energy storage device as the rotation of the control box tracks the apparent movement of the sun. Thus, the system control circuit advances to a block 912 wherein the system control unit sends a control signal to the motor control circuitry 276 to cause the motor control circuitry to activate the motor 124. More particularly, the system control circuit performs the startup routine 850 described above to assure that the control box 120 is rotated in the proper direction and to assure that the photodetector 310 is positioned in the shaded area behind the portion of the control box wall between the two openings 300, 302.

FIG. 11 illustrates the solar tracking system 100 of FIG. 1 mounted on a pair of beams 950, 952 (shown in partial cross section) proximate a skylight 960. A transparent protective dome 970 (shown in phantom) is mounted over the solar tracking system to protect the solar tracking system from weather conditions. Unlike certain systems known in the art, the protective dome only has to be self-supporting and does not provide any structural support for the solar tracking system, which is mounted directly to the beams or to other sturdy structures.

FIGS. 12-22 illustrate an embodiment of a solar tracking system 1000 in accordance with further aspects of invention. The solar tracking system 1000 is similar to the solar tracking system 100 described above, and many elements corresponding to previously described elements are not described in detail in the following paragraphs.

As shown in FIGS. 12 and 13, the solar tracking system 1000 is mounted on a roof (not shown) of a structure (not shown) on a structural frame 1010 formed of structural materials (e.g., wood, metal, or the like). For example, the structural frame advantageously comprises a generally rectangular (e.g., square) frame around an opening in the roof. The structural frame 1010 forms a fixed opening in the roof of the structure. The structural frame may also support a transparent panel 1012 at a lower portion thereof to provide a lower cover over the opening in the roof prior to installation of the solar tracking system. After installation, the transparent panel may also serve to isolate the solar tracking system from the interior environment of the structure on which the system is mounted.

The solar tracking system 1000 is positioned beneath a generally transparent protective dome 1020, which is sized and shaped to conform to the size and shape of the frame 1010. As shown in more detail in FIG. 13, the dome includes a peripheral mounting flange 1022 that is sandwiched between a lower mounting frame 1024 and an upper mounting frame 1026. In the illustrated embodiment, the lower mounting frame is secured to the structural frame by suitable fasteners (e.g., screws, nails or the like). The mounting flange rests on the lower mounting frame 1024, and the upper mounting frame is placed over the mounting flange and is secured to the lower mounting frame to securely retain the dome. The interfaces between the upper mounting frame and the mounting flange are sealed so that any moisture or other contaminants falling on the dome flow over the upper mounting frame and are blocked from entering the volume formed between the inner surface of the dome and the transparent panel 1012.

The solar tracking system 1000 is supported by a support assembly 1030. The support assembly comprises a support beam 1032 that is secured to inner walls of the structural frame 1010 by a pair of mounting brackets 1034 at each end (only one of the mounting brackets can be seen in FIGS. 12 and 13). The mounting brackets are secured to the structural frame by suitable fasteners (e.g., screws, nails, or the like).

A support post 1040 extends substantially vertically from the approximate midpoint of the support beam 1032. In the illustrated embodiment, the support post is mounted perpendicular to the support beam, which is mounted substantially horizontally on a flat roof (not shown). Preferably, if the solar tracking system 1000 is mounted on a sloped roof (not shown), the structural frame 1010 is constructed to provide a generally horizontal mounting reference for the support beam. Alternatively, the brackets at each end of the support beam are selectively positionable to maintain the support beam in a horizontal position. In certain embodiments, the support post may be mounted at an angle to the support beam to compensate for the beam being in a non-horizontal position.

As shown in FIG. 14, at least an upper end of the support post 1040 is hollow. For example, in one embodiment, the inside dimensions of the support post are approximately 0.75 inch by 0.75 inch. The hollow upper portion of the support post receives a shaft 1062 that extends from a control head 1060. The outer diameter of the shaft is approximately 0.32 inch. The portion of the shaft extending into the support post has a flat face 1064 formed thereon so that the extended portion of the shaft is generally "D" shaped. An adapter bushing 1066 is positioned into the support post. The adapter bushing has lower outside dimensions sized to fit within the support post and has upper outside dimensions to form a flange that rests on top of the support post. The adapter bushing has an inner bore that is sized and shaped to receive the extended portion of the shaft. Accordingly, the shaft is precluded from rotating with respect to the support post. In alternative embodiments, the support post is advantageously manufactured of an extruded plastic material with the upper portion having inside dimensions to receive and secure the shaft without using an adapter bushing.

The control head 1060 comprises a lower body portion 1070 and an upper removable cap 1072. A mirror support beam 1100 is secured to the bottom of the lower body portion of the control head in a manner similar to that described above with respect to the embodiment of FIGS. 1-11. The mirror support beam supports a first mirror 1110 via a first mounting bracket 1112, supports a second mirror 1114 via a second mounting bracket 1116, and supports a third mirror 1118 via a third mounting bracket 1120. The first mirror, the second mirror and the third mirror generally correspond to the first mirror 150, the second mirror 152 and the third mirror 154, respectively, in the previously described embodiment.

In the illustrated embodiment, a rear portion of the mirror support beam 1100 is generally horizontal and supports the first mirror 1110 at an angle of approximately 20 degrees with respect to vertical. The first mirror has overall dimensions of approximately 31.5 inches by 31.5 inches. The first mirror has lower rounded corners with radii of approximately 4 inches and upper rounded corners with radii of approximately 11 inches. The first mirror also has a cutout 1122 to accommodate the passage of the mirror support beam therethrough. Accordingly, the first mirror has an overall reflective surface area of approximately 528 square inches. (Reductions in reflective surface area caused by the first mounting bracket 1112 and the shadowing effect of other elements are not considered in this approximation.)

The forward portion of the mirror support beam 1100 is angled downward at an angle of approximately 45 degrees with respect to horizontal. The second mirror 1114 and the third mirror 1118 are mounted generally perpendicularly with respect to the forward portion of the mirror support beam and are thus mounted at an angle of approximately 45 degrees with respect to vertical.

The second mirror 1114 has a height of approximately 10.15 inches, has a lower edge with a width of approximately 38.37 inches and an upper edge with a width of approximately 33 inches. The upper and lower edges of the second mirror are connected by side edges having radii of curvature of approximately 9.8 inches. The second mirror has a cutout 1124 to accommodate the support post 1040. Accordingly, the second mirror has an overall reflective surface of approximately 379 square inches. (Reductions in reflective surface area caused by the second mounting bracket 1116 and the shadowing effect of other elements are not considered in this approximation.)

The third mirror 1118 has a height of approximately 6.3 inches, has a lower edge with a width of approximately 33.3 inches and an upper edge with a width of approximately 30.5 inches. The upper and lower edges of the third mirror are connected by side edges having radii of curvature of approximately 7.05 inches. Accordingly, the third mirror has an overall reflective surface of approximately 132 square inches. (The reduction in reflective surface area caused by the third mounting bracket 1120 is not considered in this approximation.)

In the embodiment illustrated in FIGS. 12 and 13, the three mirrors 1110, 1114, 1118 comprise aluminum having a thickness of approximately 0.05 inch. Approximately 0.5 inch of the lower edge of each mirror is bent at approximately 90 degrees to preclude bowing of the mirror surface in the horizontal direction. The strength and thickness of each mirror is sufficient that no supporting wires are needed for the illustrated embodiment.

The control head 1060 is similar to the control box 120 of the previous embodiment. The lower body portion 1070 of the control head supports a photovoltaic (solar) array 1200, which is generally aligned with the mirror support beam 1100. The solar array is mounted in a solar panel support frame 1202 that is mechanically connected to the lower body portion of the control head by a deformable tab 1204. Preferably, the lower body portion, the deformable tab and the solar panel support frame are formed as a single unit by injection molding a suitable plastic. The deformable tab is then bent to position the solar panel support frame at a suitable angle to direct the solar array toward the sun. For example, in one embodiment, the solar panel support frame is positioned at an angle of approximately 45 degrees with respect to horizontal. The solar panel is secured in the solar panel support frame by an upper frame member 1206 that latches onto the support frame.

FIGS. 15, 16, 17 and 18 illustrate additional details of the control head 1060. The control head is hollow and houses a DC motor 1300 that is electrically connected via a first pair of conductors 1302, 1304 and a first connector 1306 to a circuit board 1310. The circuit board is electrically connected via a second connector 1312 and a second pair of conductors 1314, 1316 to the solar array 1200.

In the illustrated embodiment, the motor 1300 comprises, for example, an FF-N30VB-0921 DC motor commercially available from Mabuchi Motor Co., Ltd., of Matsudo City, Chiba, Japan. that rotates a motor output shaft at approximately 4200 revolutions per minute when powered with a DC voltage of approximately 2.5 volts. The motor is positioned proximate to the inner periphery of the control head 1060 and is mechanically coupled by a gear train 1320 to an upper portion of the shaft 1062, which extends into the control head. The gear train advantageously comprises a 12-tooth gear A on the output shaft of the motor 1300. A first compound gear B has a 60-tooth upper gear that engages the 12-tooth gear A and has a 12-tooth lower gear. A second compound gear C has a 60-tooth upper gear that engages the lower gear of the first compound gear B and has a 12-tooth lower gear. A third compound gear D has a 60-tooth upper gear that engages the lower gear of the second compound gear C and has a lower 12-tooth gear. An 80-tooth gear E is fixed to the upper portion of the shaft 1062. The gear E engages the lower gear of the third compound gear D.

The gear train 1320 provides an overall gear reduction of 833.33 (e.g., 5×5×5×6⅔). Thus, the shaft 1062 turns once for 833.33 revolutions of the output shaft of the motor 1300. However, since the shaft is fixed with respect to the fixed support post 1040, the rotation of the motor shaft causes the control head 1060 to rotate about the support post and thus causes the mirror assembly (comprising the mirror support beam and the attached mirrors 1110, 1114, 1116) to rotate about the support post. The large overall gear ratio of the gear train allows the relatively low-powered motor to rotate mass of the control head at the mirror assembly.

As further illustrated in FIGS. 15, 16 and 18, an upper portion of the shaft 1062 within the control head 1060 is constrained by a lower roller bearing assembly 1350 and an upper roller bearing assembly 1052. The lower roller bearing assembly is secured by the lower housing portion 1070. The upper roller bearing assembly is secured within an opening formed in a support plate 1354. The support plate also includes a plurality of mounting extrusions 1356 to receive the upper ends of axles through the compound gears B, C and D of the gear train 1320.

The upper end of the shaft 1062 is capped with a magnet housing 1360. The magnet housing secures a small bar magnet 1362, which has a north pole (indicated with a band for reference) and an opposing south pole. The poles are disposed in a horizontal plane. The circuit board 1310 is positioned in the control head 1060 with an integrated 2-axis Hall sensor 1370 positioned directly over the bar magnet 1362. Thus, as the control head is caused to rotate about the shaft by the motor 1300, the Hall sensor is directly affected by the magnetic field produced by the bar magnet. In particular, the Hall sensor detects the absolute angular position of the bar magnet. The Hall sensor is commercially available. In the illustrated embodiment, the Hall sensor comprises a 2SA-10 Integrated 2-Axis Hall Sensor sold by Melexis Microelectronic Systems of Concord, N.H.

After assembling the electrical and mechanical drive components described above, the circuit board 1310 is positioned in the control head 1060. The circuit board is keyed to bosses on the lower portion 1070 of the control head to assure that the circuit board is positioned with the proper orientation. The connector 1306 that provides electrical power to the motor 1300 via the conductors 1302, 1304 is plugged into a first header 1400 on the circuit board. The connector 1312 that receives power from the solar array 1200 via the conductors 1314, 1316 is plugged into a second header 1402 on the circuit board.

FIG. 19 illustrates an embodiment of the circuitry 1500 that receives power from the solar array 1200 and that drives the motor 1300 to direct the mirrors toward the sun. As discussed below, during normal operation, the circuitry is powered by the electrical energy generated by the solar array and includes a number of power saving features and fail-safe modes so that external power and control are not required after installation.

Primary power to the circuitry 1500 is provided by the solar array 1200 as a variable voltage ($V_{SOLAR\_VAR}$) that is responsive to the intensity of the solar energy impinging on the solar array. The variable voltage is provided as an input to a power storage circuit 1510 that comprises an input diode 1512 that prevents reverse current flow, and a zener diode 1514 in series with a series diode 1516. The zener diode and the series diode 1516 are connected across a first super capacitor 1520 and a second super capacitor 1522, which are charged by the electrical current from the solar array. The zener diode and the series diode limit the voltage ($V_{CAPS}$) across the super capacitors to approximately 10.7 volts.

The super capacitors can also be charged from an external source ($V_{EXT}$) via an external connector pin in a communications connector identified as Comm1, which will be discussed below. The external voltage is coupled to the $V_{CAPS}$ voltage via a Schottky diode 1532. In the illustrated embodiment, each of the super capacitors comprises a 1.0 farad capacitor such as, for example, FC Series super capacitors from NEC/Tokin. The super capacitors are particularly advantageous because the super capacitors have a high energy density compared to conventional capacitors. Unlike most rechargeable batteries, the super capacitors can be charged and discharged hundreds of thousands of times with little degradation. The super capacitors have high rates of charge and discharge so that the super capacitors can be charged quickly during periods of intermittent sunlight and can provide bursts of energy, such as, for example, when the motor 1300 is operated.

The voltage ($V_{CAPS}$) across the super capacitors 1520, 1522 is provided to a buck power supply 1540. The buck power supply advantageously comprises a MAX1685 PWM Step-Down switching regulator from Maxim Integrated Products, Inc. The buck power supply is configured in a conventional manner with suitable resistor, inductors and capacitors (not shown) to receive an input voltage over a range of approximately 2.75 volts to approximately 10.7 volts and to produce a substantially constant output voltage of approximately 2.2 volts, which is identified as $V_{MOTOR}$. The voltage $V_{MOTOR}$ is provided to a motor driver 1542, which is described below.

The voltage $V_{MOTOR}$ produced by the buck power supply 1540 is also provided as the input voltage to a boost power supply 1550. The boost power supply is responsive to the input voltage to generate a substantially constant output voltage of approximately 5.2 volts, which is identified as $V_{BOOST}$. The boost power supply advantageously comprises a LM2623 step-up DC-DC switching regulator from National Semiconductor Corporation. The boost power supply is configured in a conventional manner with suitable resistor, inductors and capacitors (not shown).

The $V_{BOOST}$ voltage from the boost power supply 1550 is provided through a Schottky diode 1552 to a $V_{DD}$ node 1560. A super capacitor 1562 is connected to the $V_{DD}$ node to store electrical energy that supplies a control processor 1600 and other circuitry when the boost power supply 1550 is not active. In the illustrated embodiment, the super capacitor at the $V_{DD}$ node comprises a 0.1 microfarad capacitor available from NEC/Tokin.

The $V_{DD}$ node 1560 is also connected via a Schottky diode 1570 to a voltage limiting zener diode 1572. The zener diode has a voltage rating of approximately 5.1 volts and is connected to the solar array 1200 via a Schottky diode 1574 and a resistor 1576. A filter capacitor 1578 is positioned across the voltage limiting zener diode. The voltage ($V_{SOL\_LIM}$) across the zener diode and the capacitor provides an alternative source of voltage to the Vdd node directly from the solar panel 1200. During normal operations when the boost power supply 1550 is active, the $V_{BOOST}$ voltage at the output of the boost power supply has a higher voltage so that the limited voltage ($V_{SOL\_LIM}$) directly from the solar array does not provide electrical energy to the node.

The buck power supply 1540 is selectively enabled by a Buck_Enable control signal provided by a control processor 1600. The Buck_Enable signal is coupled to an enable input of the buck power supply via a field effect transistor (FET) 1580, which has its source terminal connected to ground and has its drain terminal connected to the Vcaps voltage line via a pull-up resistor 1582. The FET is normally on so that the enable input of the buck power supply is grounded to prevent the buck power supply from operating until the $V_{DD}$ voltage on the $V_{DD}$ node 1560 is sufficiently high that a voltage supervisor 1610 (discussed below) releases a reset signal to enable the control processor to operate. When the Buck_Enable signal is activated by the control processor, the buck power supply is activated to produce the Vboost voltage. By operating in this manner, the buck power supply does not consume power while the super capacitors are charging after becoming significantly discharged (e.g., immediately after initial installation of the system).

The boost power supply 1550 is selectively enabled by a Boost_Enable control signal provided by the control processor 1600. Since the boost power supply receives power from the buck power supply 1540, the boost power supply can only be enabled when the buck power supply is active. Thus, the Boost_Enable signal is supplied directly from the control processor as shown. As discussed below, the control processor saves power by only enabling the power supplies when the energy is needed. Otherwise, the control processor is able to operate on stored energy from the super capacitor 1562 connected to the $V_{DD}$ node 1560. Accordingly, the energy stored in the larger super capacitors 1520, 1522 is not drained when not needed.

The control processor 1600 advantageously comprises an ATmega166/V 8-bit microcontroller available from Atmel Corporation. The control processor is responsive to an active reset signal generated by a voltage supervisor circuit 1610 to reset to a known state and to begin operation from the known state when the reset signal is no longer active. The voltage supervisor monitors the voltage on the $V_{DD}$ node 1560 and generates a reset signal when the voltage decreases below 1.8 volts. The voltage supervisor circuit does not release the reset signal until the voltage increases above 2.4 volts. The hysteresis provided by the voltage supervisor circuit prevents the reset signal from switching on and off repeatedly as would happen if the voltage on the Vdd node varies about a fixed threshold of a circuit without hysteresis. In the illustrated embodiment, the voltage supervisor circuit comprises an MAX6428MRUR-T single level battery monitor available from Maxim Integrated Products.

The reset signal to the control processor 1600 may also be generated on a connector pin of a C$_{OMM}$1 communication port or a C$_{OMM}$2 communication port. The C$_{OMM}$1 port or the C$_{OMM}$2 port are used during installation and testing and are not used during normal operation. For example, the C$_{OMM}$1 port is a Serial Communication Interface (SCI) that operates asynchronously in accordance with the RS232 protocol using the conventional TxD and RxD signals. The C$_{OMM}$2 port is a Serial Peripheral Interface (SPI) that operates synchronously using a master in/slave out (MISO) signal, a master out/slave in (MOSI) signal and a serial clock (S$_{CK}$). In addition, each communication port includes a ground connection and a connection that allows the Vdd voltage to be monitored.

The control processor 1600 is coupled to a real-time clock circuit 1620. The control processor and the real-time clock circuit communicate via a serial clock (S$_{CK}$) signal generated by the control processor and a bidirectional serial data (S$_{DATA}$) signal. The real-time clock circuit advantageously comprises a PCF8563 Real time clock/calendar integrated circuit available from Philips Semiconductor.

The real-time clock circuit 1620 is programmed with the current date and time and accurately tracks the time and date in response to timing provided by a crystal 1622. The real-time clock circuit is primarily powered from the Vdd voltage node 1560 via a Schottky diode 1624. The real-time clock circuit is also powered by a long-life battery 1626 via a Schottky diode 1628. The battery advantageously comprises a conventional lithium battery having a voltage of, for example, 3.1 volts. Since the battery voltage is lower than the voltage on the Vdd voltage node, the real-time clock circuit does not receive power from the battery unless the voltage on the Vdd voltage node drops below the battery voltage. Accordingly, the battery can operate as a stand-by source of electrical energy for the real-time clock circuit for many years without replacement.

The real-time clock circuit 1620 generates an interrupt signal that is provided to the control processor 1600 to wake up the control processor so that the control processor is able to periodically confirm the rotational positions of the mirrors and rotate the mirrors as needed to direct the mirrors toward the position of the sun as determined by the date, time and location of the system. In particular, the control processor sets an alarm time in the real-time clock circuit and then enters a low power consumption mode until the real-time clock circuit activates the interrupt signal to wake the control processor.

As discussed above, the system 1000 includes a 2-axis Hall sensor 1370 that is responsive to the relative position of the Hall sensor on the rotating circuit board 1310 (FIG. 16) with respect to the fixed magnet 1362 on the end of the shaft 1062. (The relative rotation of the Hall sensor is represented pictorially by curved arrows in FIG. 19.)

The relative positions of the north and south poles of the magnet with respect to the Hall sensor are sensed within the sensor. The Hall sensor produces a first output signal V$_X$ and a second output signal V$_Y$, which represent the X-coordinate and the Y-coordinate, respectively, of a vector corresponding to the relative orientation of the magnet with respect to the Hall sensor. The two output signals have voltage levels that are referenced to a reference signal identified as V$_{COM}$. The three signals are provided to analog-to-digital interface of the control processor 1600, which converts the analog signals to signed digital values of X and Y. The control processor determines the current angle of the magnet with respect to the Hall sensor by calculating the arctangent of Y/X.

As discussed below, the Hall sensor 1370 is only accessed at certain times when the control processor 1600 is determining how much rotation is needed to direct the mirrors toward the current location of the sun or the anticipated location of the sun on a following day. Accordingly, the Hall sensor is only provided with power when needed. The Hall sensor receives power from the V$_{DD}$ node 1560 via a PNP transistor 1630, which is activated by an active low E$_{NABLE\_SENSOR}$ signal from the control processor. The PNP transistor provides a switched voltage (V$_{SW}$) to the power input of the Hall sensor.

As discussed above, the control processor 1600 controls the motor 1300 via a motor driver circuit 1542. The motor driver receives a M$_{OTOR}$1 signal and a M$_{OTOR}$2 signal from the control processor. When the M$_{OTOR}$1 signal is high and the M$_{OTOR}$2 signal is low, the motor driver circuit provides current to the motor in a first direction from an O$_{UT}$1 terminal to an O$_{UT}$2 terminal to cause the motor to rotate in a first direction (e.g., clockwise). When the M$_{OTOR}$1 signal is low and the M$_{OTOR}$2 signal is high, the motor driver circuit provides current to the motor in the opposite direction from the O$_{UT}$2 terminal to the O$_{UT}$1 terminal to cause the motor to operate in the opposite direction (e.g., counterclockwise). The motor driver circuit receives the V$_{MOTOR}$ voltage from the buck power supply 1540 and receives the V$_{DD}$ voltage from the V$_{DD}$ node 1560. The lower V$_{MOTOR}$ voltage is used to provide the current for driving the motor. The higher V$_{DD}$ voltage drives the logic circuitry within the motor driver circuit. Thus, the higher motor currents do not cause noise on the V$_{DD}$ voltage used for the control processor and the other digital circuits.

As further illustrated in FIG. 19, an analog-to-digital input (A/D IN) of the control processor 1600 is connected to an output of an analog buffer 1640. The analog buffer comprises an operational amplifier having an input that is connected to receive the voltage (V$_{CAPS}$) on the super capacitors 1520, 1522. The control processor is able to monitor the voltage on the super capacitors by converting the analog signal to a digital signal in an internal analog-to-digital converter. In preferred embodiments, the analog buffer has an input power connection coupled to the V$_{SW}$ power connection of the Hall sensor 1370 so that the analog buffer can be activated only when the control processor is reading the value of the super capacitor voltage.

In certain embodiments, the circuitry 1500 further includes a global positioning system (GPS) receiver 1650 mounted on the circuit board in the control head 1060 and coupled to the control processor 1600 via a serial interface, such as, for example, the SCI interface via the RxD and the TxD signal lines. The GPS receiver is selectively enabled by an E$_{NABLE\_GPS}$ signal line from the control processor. The GPS receiver may also have its power input connected to a switchable power supply (not shown) in a similar manner to the analog buffer 1640 and the Hall sensor 1370. As discussed below, the GPS receiver can be accessed to obtain accurate longitude and latitude information as well as accurate date and time information.

FIGS. 20, 21 and 22 illustrate the operation of exemplary software routines that perform the major functions that control the rotation and positioning of the mirrors in the embodiment of FIGS. 12-19. In particular, FIG. 20 (comprising FIGS. 20A and 20B) illustrates a main operational routine 2000 that is executed when the control processor 1600 is initially started from a reset condition. FIG. 21 (comprising FIGS. 21A, 21B, 21C and 21D) illustrates a movement control routine 2200 that is activated by the main operational routine. FIG. 22 illustrates the setup power routine 2400 that is activated by the main operational routine.

As illustrated in FIG. 20A, when the main operational routine 2000 begins, the control processor 1600 first turns off a watchdog timer in an activity block 2010. In an activity block 2012, the watchdog timer is set for 8 seconds. The watchdog timer is an internal logical structure within the control processor that counts the amount of time for which it is set. If the control processor is operating properly, the control processor will execute an instruction that resets and restarts the watchdog timer before the set time lapses. If the set time lapses before the watchdog timer is restarted, the watchdog timer generates an internal interrupt to the control processor to cause the control processor to execute a known routine to recover from an improper operational condition.

Since the control processor 1600 has started from a reset condition, the state of the control processor is unknown. In an activity block 2020, the control processor is initialized. In activity block 2022, the UART (SCI port interface) is initialized. In an activity block 2024, an internal EEPROM is read to determine the current operational parameters of the control processor. In particular, the EEPROM stores the longitude, the latitude and the south correction for a particular installation. The EEPROM also stores a default interval time to use to control the movement of the system during the daytime. For example, in a preferred embodiment, the default interval time is 5 minutes. The EEPROM is advantageously preprogrammed with the values before shipping the system for installation. The EEPROM may also store additional parameters that may be used for testing and identification of the system, but which are not pertinent to the operation of the system as described herein.

In an activity block 2030, the control processor 1600 activates an internal USART to activate the SCI interface to the asynchronous serial port (COMM1) and then sends data out on the serial port via the SCI interface in an activity block 2040. The control processor activates the asynchronous serial port in case the control processor is being powered up for initial installation or for maintenance, in which case an external system may be coupled to the SCI interface to communicate with the control processor.

In an activity block 2042, the control processor 1600 waits one second. Then, in a decision block 2044, the control processor determines whether any serial data was received via the serial port. If serial data has been received, the control processor is connected with an external system. Accordingly, the control processor advances to an activity block 2050 and sets an internal MODE status flag to SETUP_MODE. Then, the control processor advances to a Set Targets activity block 2094 (FIG. 20B).

If no serial data has been received when checked in the decision block 2044, the control processor 1600 determines in a decision block 2054 whether three attempts to check for serial input data have been completed. If three attempts have not been completed, the control processor returns to the activity block 2042 and waits another second. If three attempts have been made without receiving serial data, the control processor advances from the decision block 2054 to an activity block 2070 (FIG. 20B).

In the activity block 2070, the control processor 1600 sets the target values. Basically, the control processor reads the real-time clock 1620 to determine the current year, month, day, hour and minute to be used in the position calculations.

After setting the target values, the control processor 1600 sets the MODE to RUN_MODE in activity block 2072 and then proceeds to an activity block 2074. In the activity block 2074, the control processor deactivates the USART since the USART is not used during normal operations. The control processor then sets a GO_RECEIVED status flag to TRUE to indicate that the control processor is to control the movement of the control head 1060. After setting the GO_RECEIVED status flag, the control processor advances to an activity block 2080. In the activity block 2080, the control processor reads the voltage (VCAPS) on the main super capacitors 1520, 1522 (FIG. 19) via the analog buffers 2040. In a decision block 2082, the control processor determines whether the super capacitor voltage is at least 7 volts. If the super capacitor voltage is at least 7 volts, the control process advances to the activity block 2094 and sets the target values (e.g., the date and time), as discussed above.

After setting the target values, the control processor 1600 advances to an activity block 2096 and turns the buck power supply 1540 and the boost power supply 1550 off by turning off the BUCK_ENABLE signal and the BOOST_ENABLE signals, respectively. The two supplies are only needed to generate energy to move the motors and are not turned on until the control processor determines that movement is required.

After turning off the supplies, the control processor 1600 advances to an activity block 2100 and resets the watchdog timer. The control processor then advances to an activity block 2102 to execute the movement control routine 2200 illustrated in FIG. 21. When the control processor returns from the movement control routine, the control processor returns to the activity block 2100 to again reset the watchdog timer. The control processor remains in this loop until reset by an external system or by the detection of a low voltage by the voltage supervisor 1610. The control processor may also exit the loop if the watchdog timer times out.

If the control processor 1600 determines in the decision block 2082 that the super capacitor voltage (VCAPS) is less than 7 volts, the control processor advances to an activity block 2110 to add 10 minutes to the target wakeup time. The control processor then sets the target values in an activity block 2112 to set the updated target values. In an activity block 2114, the control processor normalizes the time to assure that the time is in the proper format to send to the real-time clock 1620 and transfers the wakeup time to the real-time clock. In particular, the normalize time routine assures that the time is correct when the increment in the target wakeup time rolls over to a new day, month or year. The normalize time routine also handles the adjustments for the number of days in each month including the adjustment for leap years. The control processor then powers down in an activity block 2116 until receiving an interrupt from the real-time clock when the wakeup time occurs. When powering down in this mode, the control processor retains a current state so that the control processor returns to the same state upon receiving the interrupt from the real-time clock. The power down activity block 2116 includes a step of disabling the watchdog timer so that the watchdog timer does not detect a fault caused by inactivity of the control processor while powered down.

The steps of reading the super capacitor voltage and selectively delaying for an additional 10 minutes are included to accommodate a system that has not been installed for a considerable time after the super capacitors are initially charged after manufacturing. If the voltage on the super capacitors is too low when initially installed, the electrical power from the solar array panel 1200 will quickly charge the super capacitors 1520, 1522 while the control processor 1600 is powered down. When the voltage is at least 7 volts, the control processor will execute the activity block 2090 and the subsequent steps.

FIG. 21 (comprising FIGS. 21A, 21B, 21C and 21D) illustrates the movement control routine 2200 that is called by the main routine 2000. In an activity block 2210, the control processor 1600 sets the target values to update the target values with any recent calculations. In an activity block 2212, the control processor sets an internal value representing a MOVES counter to an initial value of 0. The control processor then resets the watchdog timer in activity block 2214 to start a new 8-second count. The control processor sets the MOVES counter to MOVES+1 in an activity block 2216.

In an activity block 2220, the control processor 1600 reads the digital value on the analog-to-digital converters connected to receive the $V_X$, $V_Y$ and $V_{COM}$ values from the Hall sensor 1370. In order to access the Hall sensor, the control processor temporarily activates the ENABLE_SENSOR signal to turn on the PNP transistor 1630 to provide power to the Hall sensor. After reading the sensor values, the control processor calculates the current Hall sensor angle using the new values in an activity block 2222. In an activity block 2224, the control processor calculates a current absolute angular position of the control head 1060 based on the current Hall sensor value and the saved parameters based on the orientation of the horizontal support beam 1032. In the illustrated embodiment, the control processor also includes an offset for the angular position of the circuit board 1310 within the control head. Accordingly, the current absolute angular position accurately represents the geographic direction towards which the mirrors are currently pointing.

In an activity block 2230, the control processor 1600 initially sets an internal MOVE_DIRECTION parameter to CCW to indicate the usual direction of movement of the control head 1060. In an activity block 2232, the control processor calculates the sun azimuth in accordance with current date and time read from the real-time clock 1620 and in accordance with the latitude and longitude values that were stored at the time of installation. In an alternative embodiment, the latitude and longitude values as well as the current time may be obtained from the optional global positioning system (GPS) 1650 included as part of the electronic circuitry on the circuit board 1310. In particular, the GPS may be accessed once after a reset condition to establish the position of the solar tracking system 1000 for a new installation or after the solar tracking system has lost power (for example, after being uninstalled and repositioned at a new location). The GPS may also be accessed periodically (e.g., once per day) to verify and update the date and time provided by the real-time clock.

After calculating the sun azimuth, the control processor 1600 advances to a decision block 2234 and determines whether a calculated sun altitude is less than 0 thereby determining whether the sun is below the horizon at the current position at the current time. If the sun altitude is less than 0, the control processor sets an IN_DARKNESS parameter in an activity block 2236. Then, in an activity block 2238, the control processor calculates the time of the next sunrise and calculates the sun azimuth at the calculated sunrise time. The control processor then advances to an activity block 2240 (FIG. 21A). If the sun altitude is at least 0, the control processor advances directly to the activity block 2240 without setting the IN_DARKNESS parameter.

In the activity block 2240, the control processor 1600 sets a TARGET_ANGLE parameter to the calculated azimuth angle. The control processor then advances to a decision block 2242 to compare the current measured angular position with the calculated TARGET_ANGLE. If the current angular position is equal to the TARGET_ANGLE, the mirrors are currently pointed toward the sun and no movement is necessary. The control processor advances directly to a decision block 2250 (FIG. 21D), which is discussed below. If the current angle is not equal to the TARGET_ANGLE, the control processor advances to an activity block 2262 to calculate an AMOUNT equal to the TARGET_ANGLE minus the CURRENT_ANGLE. The AMOUNT is a calculated adjustment in degrees. Since the calculation can result in an adjustment less than 0 degrees or greater than 360 degrees, the processor executes an activity block 2264 to convert an AMOUNT less than 0 to an amount between 0 and 360 by adding 360 and executes an activity block 2266 to convert an AMOUNT greater than 360 to an amount between 0 and 360 by subtracting 360. Only one of the activity blocks 2264 and 2266 may be executed if the AMOUNT is outside the range of 0 to 360. If the AMOUNT is between 0 and 360, neither activity block is executed.

After performing any required calculation in the activity block 2264 or the activity block 2266, the control processor 1600 advances to a decision block 2270 to determine whether the calculated AMOUNT is at least as great as 180 degrees. If the amount is at least 180 degrees, the control processor advances to an activity block 2272 and sets the MOVE_DIRECTION parameter to counterclockwise (CCW). The control processor then advances to an activity block 2274 (FIG. 21C) where the control processor subtracts the amount from 360. Basically, the control processor is calculating a small rotational amount in the counterclockwise direction when the calculated amount in the clockwise direction is greater than or equal to 180 degrees. The control processor than advances to a decision block 2280.

If the calculated AMOUNT is less than 180 degrees, the control processor 1600 advances from the decision block 2270 to an activity block 2276 where the control processor sets the MOVE_DIRECTION parameter to clockwise (CW). The control processor advances from the activity block 2276 directly to the decision block 2280.

In the decision block 2280, the control processor 1600 tests whether the AMOUNT is greater than 6. If the AMOUNT is greater than 6, the control processor advances to a decision block 2282 and determines whether the IN_DARKNESS parameter is TRUE. If the IN_DARKNESS parameter is not set, the control processor sets the AMOUNT to a maximum value of 6 in an activity block 2284 and then advances to a decision block 2286. If the In_Darkness parameter is set, the control processor advances directly to the decision block 2286 without adjusting the value of the AMOUNT. If the control processor determines that the AMOUNT is no more than 6, the control processor advances directly from the decision block 2280 to the decision block 2286. As discussed below, the AMOUNT represents the angular amount of rotation allowed per motor operation. During the daytime, the AMOUNT is limited to 6 degrees. At night, the AMOUNT can be greater than 6 so that the mirrors can be quickly rotated to a calculated position for the next morning.

In the decision block 2286, the control processor 1600 determines whether the current value of the MOVES parameter is equal to 1. If the MOVES parameter is equal to 1, the control processor advances to a decision block 2288 and again tests whether the IN_DARKNESS parameter is TRUE. If the In_Darkness parameter is not True, the control processor advances to an activity block 2290 (FIG. 21D) and multiplies the AMOUNT times 1.5 to cause the first daytime move in a move sequence to be greater than the subsequent moves. The control processor then advances to a decision block 2292.

If the In_Darkness parameter is TRUE in the decision block 2288 or if the MOVES count is not equal to 1 in the decision block 2286, the control processor 1600 bypasses the activity block 2290 and advances directly to the decision block 2292.

In the decision block 2292, the control processor 1600 determines whether the AMOUNT is greater than 1. If the AMOUNT is not greater than 1, the control processor advances to the decision block 2250, which is discussed below.

If the AMOUNT is greater than 1, the control processor 1600 advances from the decision block 2292 to an activity block 2300. In the activity block 2300, the control processor activates the buck power supply 1540 to generate the Vmotor voltage for the motor driver circuit 1542 and activates the boost power supply 1550 so that the voltage on the VDD node 1560 is provided with a consistent source of DC power derived from the energy stored in the main super capacitors 1520, 1522 during the motor operation. During times when the motor is not operating, the Vdd voltage stored on the small super capacitor 1562 at the VDD node is sufficient to operate the digital circuits, and the buck power supply and the boost power supply are not needed during those times.

In the activity block 2300, the control processor 1600 sends signals to the motor driver circuit 1542 to activate the motor 1300 for an amount of time corresponding to the calculated and adjusted AMOUNT. After the motor movement is completed, the control processor turns off the buck power supply 1540 and the boost power supply 1550. Thereafter, the control processor returns to the activity block 2214 (FIG. 21A) and repeats the process just described until the control processor advances to the decision block 2250 when the AMOUNT is no greater than 1 (decision block 2290) or the Current_Angle is equal to the Target_Angle (decision block 2242 in FIG. 21B).

As discussed above, the control processor 1600 advances to the decision block 2250 from the decision block 2242 (FIG. 21B) when the CURRENT_ANGLE is equal to the TARGET_ANGLE or from the decision block 2292 when the AMOUNT is not greater than 1. In either of the two cases, no movement is to be performed during the current pass through the movement control routine 2200. In the decision block 2250, the control processor determines whether the IN_DARKNESS status flag is TRUE. If the IN_DARKNESS status flag is not TRUE when tested in the decision block 2250, the control processor advances to an activity block 2310 and adds the interval time (e.g., 5 minutes in the illustrated embodiment) to the previous alarm time so that the control processor will be awakened again in 5 minutes. The control processor than advances to an activity block 2312. If the IN_DARKNESS status flag is TRUE, the control processor advances directly to an activity block 2312 from the decision block 2310 without adjusting the alarm time, which has already been calculated for the time of the next sunrise.

In the activity block 2312, the control processor normalizes the wakeup time and transfers the wakeup time to the real-time clock 1620 as an alarm value. The control processor then advances to an activity block 2314 where the control processor turns off any unnecessary power and ceases activity until the control processor receives an interrupt from the real-time clock at the designated alarm time. The control processor also disables the watchdog timer during this time so that the watchdog timer does not reset the control processor during this portion of the normal operation of the control processor. The activities to power down until the next alarm is received are illustrated in FIG. 22, described below.

During the daytime, the alarm time is advantageously set to a selected time after the current time. For example, in one embodiment, the alarm time is set for five minutes after the current time so that control processor 1600 wakes up every five minutes to determine how far to rotate the control head in order to direct the mirrors toward the sun. In alternative embodiments, the interval for the alarm times may be varied. For example, during the early morning hours and late evening hours during the summer, the elevation of the sun may change rapidly without significant changes in the azimuthal position. Thus, the control processor may be awakened less often. During the middle of the daytime hours, the azimuthal position changes more rapidly, and the control processor may use a smaller interval between wakeup times. After the sun sets, the mirrors are quickly rotated to the calculated azimuthal position of the sun for the following morning, and the wakeup alarm is set for a calculated time after sunrise.

When the wakeup time occurs and the real-time clock 1620 interrupts the control processor 1600, the control processor executes an activity block 2320 in which the control processor reads the internal EEPROM to retrieve the longitude and latitude values and the south correction value. The control processor also re-enables the watchdog timer. The control processor then advances to a decision block 2322 and determines whether the IN_DARKNESS status flag is set to TRUE. If the IN_DARKNESS status flag is TRUE, the control processor is being awakened after powering down for the night; otherwise, the control processor is being awakened following a prior movement during the daytime.

If the IN_DARKNESS status flag is TRUE, the control processor 1600 advances from the decision block 2322 to an activity block 2330 where the control processor sets the TARGET values and then advances to an activity block 2332 where the control processor sets the IN_DARKNESS status flag to False. The control processor than exits the movement control routine and returns to the main routine in FIG. 20B.

FIG. 22 illustrates the power down routine 2400 that is activated by the control processor 1600 from the activity block 2314 in FIG. 21D and also from the activity block 2116 in FIG. 20B. In the power down routine, the control processor turns off all unnecessary power and then shuts itself down in a sleep mode until awakened by an alarm interrupt from the real-time clock 1620. During the sleep mode, the control processor consumes minimal power.

The power down routine 2400 starts in activity block 2410 where the control processor 1600 sets the alarm day and time using the normalized date and time values calculated in the previously described steps. Then, in an activity block 2412, the control processor shuts down any unnecessary devices including the buck power supply 1540, the boost power supply 1550, the Hall sensor 1370, analog buffer 1640, and any internally switchable devices, such as, the communications interfaces described above.

After shutting down the unnecessary devices, the control processor 1600 advances to an activity block 2420 and resets any previously received interrupt so that an interrupt will not be present when the control processor enables interrupts in the next step. The control processor then advances to an activity block 2422 and enables interrupts. The control processor then enables the processor sleep mode in an activity block 2424. In particular, the control processor selects a mode in which all non-essential processes will be stopped including instruction operation. After selecting the sleep mode, the control processor disables the watchdog timer so that the watchdog timer will not generate an interrupt only a few seconds after the control processor stops executing instructions.

After setting up the system for sleeping in the previous blocks, the control processor 1600 advances to an activity block 2440 where the control processor executes the instruction that causes the control processor to enter the selected sleep mode. When the instruction is executed, all further instruction execution stops. The instruction counter within the control processor is set to the next instruction to be executed when the control processor receives the wakeup alarm interrupt from the real-time clock 1620. The control processor remains in the sleep state for as little as five minutes during the daytime. The duration of the sleep state during the night will vary in accordance with the time of year and the latitude at which the system is installed.

When the real-time clock 1620 reaches the date and time set for the alarm, the real-time clock activates the hardware interrupt to the control processor 1600, as represented by a block 2450. Interrupt handling hardware within the control processor responds to the hardware interrupt by activating the instruction execution logic within the control processor, which causes the control processor to execute the instruction following the sleep instruction in the activity block 2440. In particular, the control processor wakes up and resumes instruction execution in an activity block 2460. The control processor first disables the processor sleep mode in an activity block 2470 so that any inadvertent execution of a go to sleep instruction cannot cause the control processor to go to sleep until the real-time clock has been programmed with a new alarm date and time subsequent to the current date and time. The control processor than enables the watchdog timer in an activity block 2472 and returns to the routine that called the power down routine 2400. For example, if the power down routine was called by the activity block 2314 in FIG. 21D, the control processor returns to the activity block 2320 and performs the functions described above.

As described above, the solar tracking unit is self-powered from solar energy and includes power saving features that allow the unit to operate for many years without requiring external communications and without requiring an external source of energy. In particular, the control processor 1600 is programmed to shut down all unnecessary devices until needed to move the control head or to measure the current angular position of the control head. By implementing the power saving functions, the system is able to operate by relying solely on the solar array 1200 to maintain the super capacitors in a charged condition.

One skilled in art will appreciate that the foregoing embodiments are illustrative of the present invention. The present invention can be advantageously incorporated into alternative embodiments while remaining within the spirit and scope of the present invention, as defined by the appended claims.

What is claimed is:

1. A solar tracking system mountable above a skylight of a building, comprising:
   a control box;
   an electrical motor within the control box that drives the control box about a shaft that extends below the control box;
   a vertical support structure positionable above a central portion of the skylight, the vertical support structure having an upper portion that receives the shaft extending from the control box;
   a motion control circuit within the control box that controls the motor to cause the control box to rotate about the extended shaft;
   a voltage supply circuit within the control box to provide electrical energy to the motion control circuit and the motor;
   a solar array mechanically and electrically coupled to the control box, the solar array producing electrical energy in response to sunlight and providing the electrical energy to the voltage supply circuit within the control box sufficient to operate the control box without any other source of electrical energy; and
   a plurality of mirrors coupled to the control box to rotate with the control box, the mirrors positioned at respective angles to reflect sunlight through the skylight into the building.

2. The solar tracking system as defined in claim 1, wherein the motion control circuit intermittently rotates the control box during daytime hours to position the mirrors towards calculated positions of the sun, and wherein the motion control circuit rotates the control box at the end of a day to a calculated position of the sun at sunrise on the next following day.

3. The solar tracking system as defined in claim 2, wherein the motion control circuit calculates the position of the azimuthal position of the sun based on the date and time of day and based on at least the latitude and longitude position of the solar tracking system.

4. The solar tracking system as defined in claim 3, wherein the latitude and longitude position are permanently stored in a non-volatile memory within the motion control circuitry.

5. The solar tracking system as defined in claim 3, wherein the latitude and longitude position and the date and time of day are obtained by accessing a global positioning receiver incorporated into the motion control circuitry.

6. The solar tracking system as defined in claim 1, wherein voltage supply circuit comprises:
   a first voltage generating circuit comprising passive components coupled to the electrical output of the solar array, the first voltage generating circuit charging at least a first storage capacitor to a variable voltage, the variable voltage across the storage capacitor limited to a maximum value by a first voltage limiting device;
   a second voltage generating circuit comprising passive components coupled to the electrical output of the solar array, the second voltage generating circuit comprising a second voltage limiting device to provide a limited output voltage, the limited output voltage provided to a common voltage node, the common node being coupled to the power input terminals of digital devices in the motion control circuit;
   a third voltage generating circuit comprising a buck power supply coupled to receive the variable voltage from the first voltage circuit, the buck power supply producing a first constant voltage when enabled by the motion control circuit, the first constant voltage provided as a power source for the electrical motor;
   a fourth voltage generating circuit comprising a boost power supply coupled to receive the first constant voltage, the boost power supply producing a second constant voltage when enabled by the motion control unit, the second constant voltage provided to the common voltage node such the voltage at the common voltage node is the higher of the limited output voltage from the second voltage generating circuit or the second constant voltage; and
   a second storage capacitor coupled to the common voltage node to be charged by the higher of the limited output voltage from the second voltage generating circuit or the second constant voltage from the fourth voltage generating circuit, and supply electrical energy to the common voltage node when the limited output voltage and the second constant voltage are both less than the voltage across the second storage capacitor.

7. The solar tracking system of as defined in claim 6, wherein the buck power supply is selectively enabled by an enable signal from the motion control circuit, and wherein the enable signal is maintained in an inactive state until the motion control circuit receives a sufficient voltage from the first voltage generating circuit to be fully operational.

8. The solar tracking system as defined in claim 1, wherein the first storage capacitor is a super capacitor.

9. The solar tracking system as defined in claim 8, the first storage capacitor has a capacitance of at least 1 farad.

10. The solar tracking system as defined in claim 1, wherein the second storage capacitor is a super capacitor.

11. A solar tracking system mountable above a skylight of a building, comprising:
   a control box;
   a motor assembly within the control box, the motor assembly including a motor shaft that extends below the control box;
   a vertical support structure positionable above a central portion of the skylight, the vertical support structure having an upper portion coupled to the motor shaft to position the control box above the upper portion;
   control circuitry within the control box that controls the motor to cause the control box to rotate about the motor shaft approximately once per day;
   an energy storage device within the control box to provide electrical energy to the control circuitry and to the motor assembly;
   a solar array mechanically and electrically coupled to the control box, the solar array producing electrical energy in response to sunlight and providing the only source of electrical energy to charge the recharge the energy storage device; and
   a plurality of mirrors coupled to the control box to rotate with the control box, the mirrors positioned at respective angles to reflect sunlight through the skylight into the building.

12. The solar tracking system as defined in claim 11, wherein:
   the control box has an outer wall which is penetrated by at least first and second openings located at respective first and second angular positions with respect to an axis of rotation of the motor shaft, each opening admitting a respective beam of sunlight into the control box when the respective opening is facing in a direction generally toward the sun;
   the control box includes at least one photodetector, the photodetector located in the control box at an angular position between the first and second angular positions of the first and second openings, so that the photodetector is in a shaded position between the beams of sunlight admitted through the first and second openings unless the control box rotates to a position to allow the beam of sunlight admitted through one of the first and second openings to impinge upon the photodetector; and
   the control circuitry is responsive to the electrical signal from the photodetector to adjust the angular position of the control box to cause the photodetector to be shaded from the sun between the beams of sunlight from the first and second openings.

13. The solar tracking system as defined in claim 12, wherein the solar array and the plurality of mirrors face the sun when the photodetector is shaded from sunlight passing through either of the two openings.

14. The solar tracking system as defined in claim 12, wherein the photodetector is inactive when the photodetector is shaded from the beams of sunlight passing through the two openings.

15. The solar tracking system as defined in claim 12, wherein the control circuitry is responsive to an active signal from the photodetector to automatically determine which opening is admitting sunlight impinging on the photodetector and to position the control box so that the photodetector is positioned in the shade between the beams of sunlight from the first and second openings.

16. The solar tracking system as defined in claim 12, wherein the control circuitry automatically adapts to a new installation to rotate the control box until the photodetector detects sunlight through one of the openings and to then rotate the control box until the photodetector detects sunlight through the other opening, the control circuitry responsive to the direction of rotation when the photodetector detects sunlight through the other opening to determine whether the solar tracking system is located in the northern hemisphere or the southern hemisphere, the control circuitry setting the direction of rotation of the control box in accordance with the location of the solar tracking system.

* * * * *

UNITED STATES PATENT AND TRADEMARK OFFICE
CERTIFICATE OF CORRECTION

PATENT NO. : 7,430,077 B2 Page 1 of 1
APPLICATION NO. : 11/754156
DATED : September 30, 2008
INVENTOR(S) : Steven Briee et al.

It is certified that error appears in the above-identified patent and that said Letters Patent is hereby corrected as shown below:

In Column 29 at line 28 (Claim 11 at line 20), replace "energy to charge the recharge" to --energy to recharge--.

Signed and Sealed this

Eleventh Day of May, 2010

David J. Kappos
*Director of the United States Patent and Trademark Office*